(12) United States Patent
Sugimura et al.

(10) Patent No.: US 10,562,371 B2
(45) Date of Patent: Feb. 18, 2020

(54) AIR CONDITIONING SYSTEM

(71) Applicant: DENSO CORPORATION, Kariya, Aichi-pref. (JP)

(72) Inventors: Kengo Sugimura, Kariya (JP); Yoshiki Katoh, Kariya (JP); Koji Miura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 176 days.

(21) Appl. No.: 15/754,304

(22) PCT Filed: Aug. 26, 2016

(86) PCT No.: PCT/JP2016/074960
§ 371 (c)(1),
(2) Date: Feb. 22, 2018

(87) PCT Pub. No.: WO2017/038677
PCT Pub. Date: Mar. 9, 2017

(65) Prior Publication Data
US 2018/0251011 A1 Sep. 6, 2018

(30) Foreign Application Priority Data
Aug. 28, 2015 (JP) ................................. 2015-169395

(51) Int. Cl.
*B60H 1/00* (2006.01)
*B60H 1/03* (2006.01)
(Continued)

(52) U.S. Cl.
CPC ......... *B60H 1/00899* (2013.01); *B60H 1/004* (2013.01); *B60H 1/034* (2013.01);
(Continued)

(58) Field of Classification Search
CPC .... B60H 1/00899; B60H 1/004; B60H 1/034; B60H 1/2218; B60H 2001/224; B60H 1/00278; B60H 1/00; B60K 11/02
See application file for complete search history.

(56) References Cited

U.S. PATENT DOCUMENTS

2011/0197611 A1* 8/2011 Hall .................... B60H 1/00378
62/238.7
2014/0374081 A1* 12/2014 Kakehashi ............. B60K 11/02
165/202
(Continued)

FOREIGN PATENT DOCUMENTS

JP 2002096629 A 4/2002
JP 2013230805 A 11/2013
(Continued)

*Primary Examiner* — Frantz F Jules
*Assistant Examiner* — Lionel Nouketcha
(74) *Attorney, Agent, or Firm* — Harness, Dickey & Pierce, P.L.C.

(57) ABSTRACT

An air conditioning system has a heat pump, a first-liquid-medium circuit in which a first liquid medium circulates, a second-liquid-medium circuit in which a second liquid medium circulates, a heat source, a connection switching device, and a controller. The connection switching device switches between a connection state in which the heat source is connected to the second-liquid-medium circuit and a disconnection state in which the heat source is disconnected from the second-liquid-medium circuit. The controller controls the connection switching device to switch between the connection state and the disconnection state based on a heat-related physical quantity relating to a heat of the first-liquid-medium circuit, a heat-related physical quantity a heat of the second-liquid-medium circuit, a heat-related physical quantity the heat generated by the heat source, or a heat-related physical quantity a heat of the heat pump.

14 Claims, 20 Drawing Sheets

(51) Int. Cl.
*B60H 1/12* (2006.01)
*B60H 1/22* (2006.01)
*B60K 11/02* (2006.01)

(52) U.S. Cl.
CPC ............. *B60H 1/12* (2013.01); *B60H 1/2218* (2013.01); *B60H 1/00* (2013.01); *B60H 1/00278* (2013.01); *B60H 2001/224* (2013.01); *B60H 2001/2296* (2013.01); *B60K 11/02* (2013.01)

(56) References Cited

U.S. PATENT DOCUMENTS

| | | | |
|---|---|---|---|
| 2015/0000327 A1* | 1/2015 | Kakehashi | F25D 17/02 62/434 |
| 2015/0129161 A1* | 5/2015 | Nishikawa | B60K 11/02 165/43 |
| 2016/0109163 A1 | 4/2016 | Enomoto et al. | |

FOREIGN PATENT DOCUMENTS

| | | | |
|---|---|---|---|
| JP | 2013256207 | A | 12/2013 |
| JP | 2014201148 | A | 10/2014 |
| WO | WO-2014196186 | A1 | 12/2014 |

\* cited by examiner

AIR CONDITIONING SYSTEM

CROSS REFERENCE TO RELATED APPLICATIONS

This application is a U.S. National Phase Application under 35 U.S.C. 371 of International Application No. PCT/JP2016/074960 filed on Aug. 26, 2016 and published in Japanese as WO 2017/038677 A1 on Mar. 9, 2017. This application is based on and claims the benefit of priority from Japanese Patent Application No. 2015-169395 filed on Aug. 28, 2015. The entire disclosures of all of the above applications are incorporated herein by reference.

TECHNICAL FIELD

The present disclosure relates to an air conditioning system that performs a heating operation.

BACKGROUND ART

As this type of heat exchange system, there is a conventionally known thermal management system for a vehicle described in Patent Literature 1, for example. The thermal management system for the vehicle described in Patent Literature 1 is to solve a problem of refrigerant drawn into a compressor, which is too low in density to exert sufficient performance, when a heat pump cycle is used to perform warm-up or heating at an extremely low outside-air temperature. In order to solve the problem, the thermal management system for the vehicle in Patent Literature 1 has a water heat absorbing and water heating heat pump cycle. The thermal management system for the vehicle causes cooling water increased in temperature on a high-pressure side of the heat pump cycle to flow to a low-pressure side of the heat pump cycle as well to increase a density of the refrigerant drawn into the compressor to thereby increase work of the compressor to secure necessary performance.

PRIOR ART LITERATURES

Patent Literature

Patent Literature 1: JP 2014-201148 A

SUMMARY OF INVENTION

The thermal management system for the vehicle in Patent Literature 1 can enhance heating performance by switching a flow of the cooling water. However, there is a cold body such as a battery and an engine which may be an object to be cooled or heated in a vehicle, for example. Although the thermal management system for the vehicle in Patent Literature 1 has heat exchangers that causes different fluids such as refrigerant, heat medium, and air to exchange heat with each other, the thermal management system does not try to enhance performance, e.g., the heating performance by means of provision and reception of heat to and from the cold body. In other words, the thermal management system for the vehicle in Patent Literature 1 has room for enhancement of the heating performance by utilization of the cold body provided outside.

The present disclosure addresses the above-described issues, and it is an objective of the present disclosure to provide an air conditioning system in which heating performance can be enhanced by provision and reception of heat to and from a heat source corresponding to the cold body.

To achieve the objective, according to a first aspect of the present disclosure, an air conditioning system performs a heating operation for heating an air-conditioning target space. The air conditioning system has a heat pump, a first-liquid-medium circuit, a second-liquid-medium circuit, a heat source, a connection switching device, and a controller. The heat pump includes a liquid cooler, a compressor, a refrigerant radiator, and a pressure reducer. The compressor draws refrigerant flowing out of the liquid cooler, compresses the refrigerant, and discharges the refrigerant. The refrigerant flows into the refrigerant radiator from the compressor. The refrigerant radiator dissipates at least a part of heat of the refrigerant to a conditioned air. The conditioned air is blown into the air-conditioning target space. The pressure reducer reduces a pressure of the refrigerant flowing out of the refrigerant radiator and flows the refrigerant to the liquid cooler. A first liquid medium circulates through the first-liquid-medium circuit. The second-liquid-medium circuit is provided separately from the first-liquid-medium circuit. A second liquid medium circulates through the second-liquid-medium circuit. The heat source generates heat. The connection switching device switches between a connection state in which the heat source is connected to the second-liquid-medium circuit and a disconnection state in which the heat source is disconnected from the second-liquid-medium circuit. The controller controls the connection switching device. The refrigerant radiator includes a liquid heater that transfers the heat of the refrigerant to the first liquid medium by performing a heat exchange between the first liquid medium and the refrigerant. The liquid cooler transfers heat of the second liquid medium to the refrigerant by performing a heat exchange between the second liquid medium and the refrigerant. The controller controls the connection switching device to switch between the connection state and the disconnection state based on a heat-related physical quantity relating to a heat of the first-liquid-medium circuit, a heat-related physical quantity relating to a heat of the second-liquid-medium circuit, a heat-related physical quantity relating to the heat generated by the heat source, or a heat-related physical quantity relating to a heat of the heat pump.

In this way, it is possible to suitably supply the heat of the heat source to the second liquid medium circulating through the second-liquid-medium circuit. Then, the heat of the second liquid medium is eventually supplied to the conditioned air via the heat pump. Therefore, by provision and reception of the heat to and from the heat source and the second liquid medium, it is possible to enhance heating performance.

According to a second aspect of the present disclosure, an air conditioning system performs a heating operation for heating an air-conditioning target space. The air conditioning system has a heat pump, a first-liquid-medium circuit, a second-liquid-medium circuit, a heat source, a connection switching device, and a controller. The heat pump includes a liquid cooler, a compressor, a refrigerant radiator, and a pressure reducer. The compressor draws a refrigerant flowing out of the liquid cooler, compresses the refrigerant, and discharges the refrigerant. The refrigerant flows into the refrigerant radiator from the compressor. The refrigerant radiator dissipates at least a part of heat of the refrigerant to a conditioned air. The conditioned air is blown into the air-conditioning target space. The pressure reducer reduces a pressure of the refrigerant flowing out of the refrigerant radiator and flows the refrigerant to the liquid cooler. A first liquid medium circulates through the first-liquid-medium circuit. The second-liquid-medium circuit is provided separately from the first-liquid-medium circuit. A second liquid medium circulates through the second liquid-medium-circuit. The heat source generates heat. The connection switching device connects the heat source to the first-liquid-medium circuit or the second-liquid-medium circuit. The controller controls the connection switching device. The second liquid medium circuit includes an outside-air heat absorber that transfers heat of an outside air to the second liquid medium by performing a heat exchange between the outside air and the second liquid medium. The refrigerant radiator includes a liquid heater that transfers the heat of the refrigerant to the first liquid medium by performing a heat exchange between the first liquid medium and the refrigerant. The liquid cooler transfers heat of the second liquid medium to the refrigerant by performing a heat exchange between the second liquid medium and the refrigerant. The controller controls the connection switching device to set the connection state in which the heat source is connected to the first-liquid-medium circuit before a specified time (t1) elapses from a time where the heating operation starts and controls the connection switching device to set the connection state in which the heat source is connected to the second-liquid-medium circuit after the specified time elapses from the time where the heating operation starts.

According to the above-described configuration, a performance of the heating operation can be improved by transferring heat between the heat source and the first liquid medium or the second liquid medium. In addition, when starting the heating operation, a temperature of the first liquid medium having a great effect on heating the conditioned air increases promptly. Moreover, a deterioration of the performance of the heating operation due to a frost formed on the outside-air heat absorber can be suppressed after a specified time elapses from a time where the heating operation is started.

According to a third aspect of the present disclosure, an air conditioning system performs a heating operation for heating an air-conditioning target space. The air conditioning system has a heat pump, a first-liquid-medium circuit, a second-liquid-medium circuit, a heat source, and a controller. The heat pump includes a liquid cooler, a compressor, a liquid heater, and a pressure reducer. The compressor draws a refrigerant flowing out of the liquid cooler, compresses the refrigerant, and discharges the refrigerant. The refrigerant flows into the liquid heater from the compressor. The pressure reducer reduces a pressure of the refrigerant flowing out of the liquid heater and flows the refrigerant to the liquid cooler. A first liquid medium flows through the first-liquid-medium circuit. The second-liquid-medium circuit is provided separately from the first-liquid-medium circuit. A second liquid medium circulates through the second liquid-medium-circuit. The heat source generates heat. The first-liquid-medium circuit includes a radiator, a heat-source flow path, and a switching valve. The radiator transfers heat of the first liquid medium to a conditioned air by performing a heat exchange between the first liquid medium and the conditioned air. The heat-source flow path is connected to the radiator in parallel and supplies the first liquid medium to the heat source. The switching valve opens and closes the heat-source flow path. The liquid heater transfers heat of the refrigerant to the first liquid medium by performing a heat exchange between the first liquid medium and the refrigerant. The liquid cooler transfers heat of the second liquid medium to the refrigerant by performing a heat exchange between the second liquid medium and the refrigerant. The controller controls the switching valve to open the heat-source flow path when a temperature of the first liquid medium is lower than a temperature of the heat source.

In this way, it is possible to utilize the heat of the heat source for heating without reducing the temperature of the first liquid medium heated by the liquid heater. Therefore, by provision and reception of the heat to and from the heat source and the first liquid medium, it is possible to enhance the heating performance.

According to a fourth aspect of the present disclosure, an air conditioning system performs a heating operation for heating an air-conditioning target space. The air conditioning system has a heat pump, a first-liquid-medium circuit, a second-liquid-medium circuit, a heat source, and a controller. The heat pump includes a liquid cooler, a compressor, a liquid heater, and a pressure reducer. The compressor draws a refrigerant flowing out of the liquid cooler, compresses the refrigerant, and discharges the refrigerant. The refrigerant flows into the liquid heater from the compressor. The pressure reducer reduces a pressure of the refrigerant flowing out of the liquid heater and flows the refrigerant to the liquid cooler. A first liquid medium circulates through the first-liquid-medium circuit. The second-liquid-medium circuit is provided separately from the first-liquid-medium circuit. A second liquid medium circulates through the second liquid-medium-circuit. The heat source generates heat. The first-liquid-medium circuit includes a radiator that transfers heat of the first liquid medium to a conditioned air by performing a heat exchange between the first liquid medium and the conditioned air. The second-liquid-medium circuit includes an outside-air heat absorber, a heat-source flow path, and a switching valve. The outside-air heat absorber transfers heat of an outside air to the second liquid medium by performing a heat exchange between the outside air and the second liquid medium. The heat-source flow path is connected to the outside-air heat absorber in parallel and supplies the second liquid medium to the second heat source. The switching valve opens and closes the heat-source flow path. The liquid heater transfers heat of the first liquid medium to the refrigerant by performing a heat exchange between the first liquid medium and the refrigerant. The liquid cooler transfers heat of the second liquid medium to the refrigerant by performing a heat exchange between the second liquid medium and the refrigerant. The controller controls the switching valve to open the heat-source flow path when a temperature of the second liquid medium is lower than a temperature of the heat source. The control unit opens the switching valve when a temperature of the second liquid medium is lower than a temperature of the heat source.

In this way, it is possible to utilize the heat of the heat source for the heating without reducing the temperature of the second liquid medium cooled by the liquid cooler. Therefore, by provision and reception of the heat to and from the heat source and the second liquid medium, it is possible to enhance the heating performance.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

Figure 1:
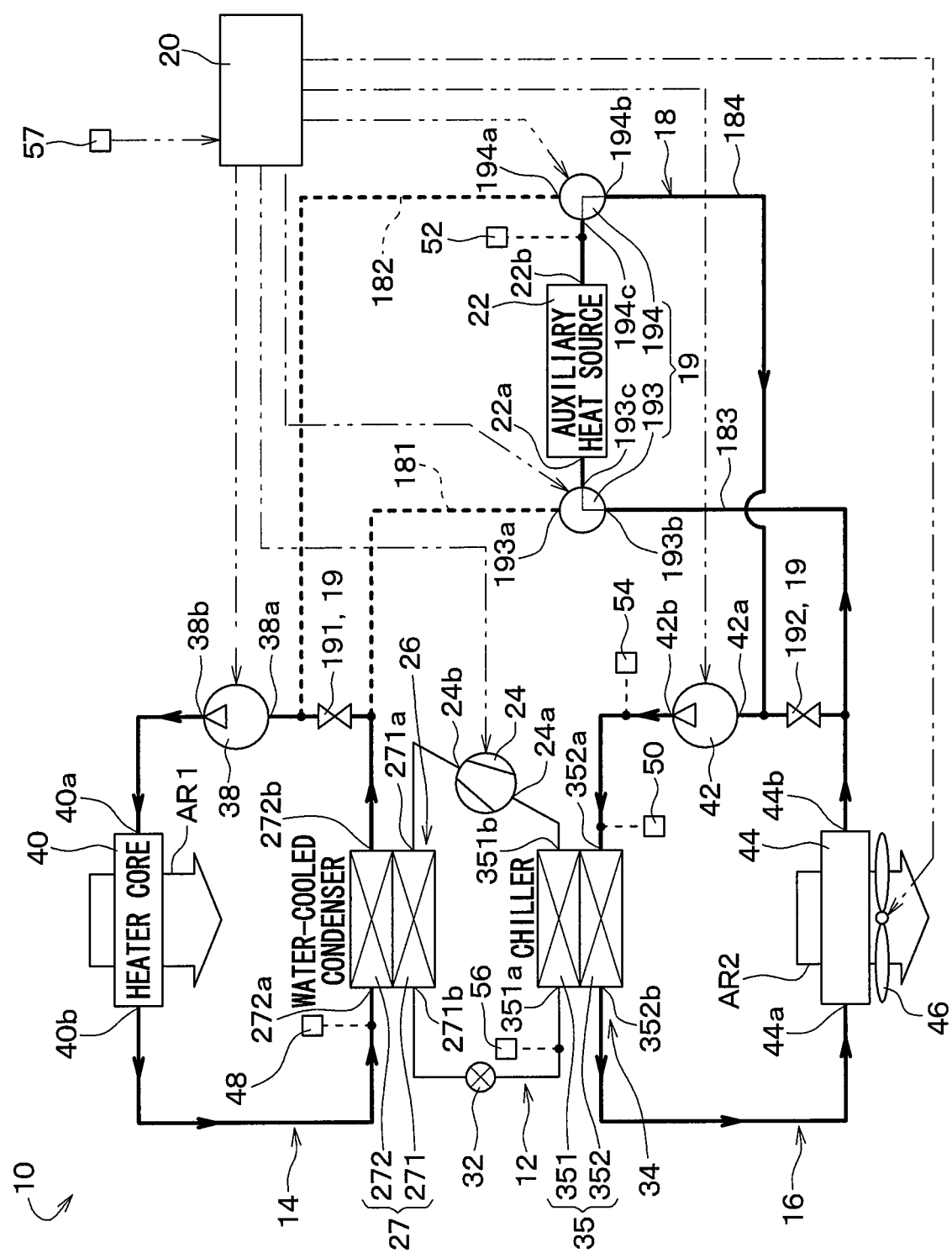
FIG. 1 is a circuit diagram illustrating a whole configuration of an air conditioning system in a first embodiment.

FIG. 1 is a circuit diagram illustrating a whole configuration of an air conditioning system 10 in the present embodiment. In the air conditioning system 10 in the present embodiment, as shown in FIG. 1, a water refrigerant heat exchanger is used for each of a high-pressure-side heat exchanger and a low-pressure-side heat exchanger of a heat pump 12. In particular, the air conditioning system 10 includes a configuration in which a cold body 22 as another heat source (e.g., an electric heater, inverter exhaust heat, and an engine) is used to secure heating performance in heating operation. For example, the air conditioning system 10 is possibly used when a temperature of a liquid medium, which exchanges heat with a refrigerant in the low-pressure-side heat exchanger, is close to a freezing point, i.e., when the temperature of the liquid medium is extremely low or a frost is formed. The present embodiment proposes that heat of the cold body 22 is transferred to a required device when the temperature is extremely low or the frost is formed.

The air conditioning system 10 is mounted to a hybrid vehicle or an electric car, for example, and performs heating operation for heating an inside of a vehicle compartment by heating a conditioned air AR1 blown into the vehicle compartment which is an air-conditioning target space. For this purpose, as shown in FIG. 1, the air conditioning system 10 includes the heat pump 12, a first-liquid-medium circuit 14, a second-liquid-medium circuit 16, a cold body connecting flow path 18, a circuit switching device 19, and an electronic control unit 20 as a controller of the air conditioning system 10. The heat pump 12 is formed by a refrigeration cycle through which refrigerant circulates. The first-liquid-medium circuit 14 is a liquid medium circuit through which first liquid medium heated by the refrigerant circulates. The second-liquid-medium circuit 16 is a liquid medium circuit through which second liquid medium cooled by the refrigerant circulates.

The air conditioning system 10 is configured by combining a water heat absorbing water heating heat pump cycle that absorbs heat from the second liquid medium and heats the first liquid medium and the cold body connecting flow path 18 as a heat source circuit that causes the first liquid medium or the second liquid medium to flow through the cold body 22. The water heat absorbing water heating heat pump cycle is a cycle that is formed by the first and second-liquid-medium circuits 14 and 16 and the heat pump 12 and that performs a heat pump operation by using outside air.

Although the first liquid medium and the second liquid medium may be different kinds of liquid from each other, the first liquid medium and the second liquid medium in the present embodiment are the same kind of liquid and are antifreeze, for example. In FIG. 1, arrows provided to each of the first-liquid-medium circuit 14, the second-liquid-medium circuit 16, and the cold body connecting flow path 18 represent a flow direction of the first liquid medium or the second liquid medium. The first liquid medium may be referred to as "high-temperature side cooling water" and the second liquid medium may be referred to as "low-temperature side cooling water because the first liquid medium is higher than the second liquid medium in temperature. The first-liquid-medium circuit 14 may be referred to as "high-temperature circuit" and the second-liquid-medium circuit 16 may be referred to as "low-temperature circuit".

The heat pump 12 configures a vapor compression subcritical refrigeration cycle in which a pressure of high-pressure side refrigerant does not exceed a critical pressure of the refrigerant. The heat pump 12 is configured by a compressor 24, a refrigerant radiator 26 that causes the refrigerant to dissipate heat, a pressure reducer 32, a refrigerant heat absorber 34 that causes the refrigerant to absorb heat, and the like.

The compressor 24 includes a suction port 24a that draws the refrigerant and a discharge port 24b that discharges the refrigerant. The compressor 24 draws the refrigerant flowing out of the refrigerant heat absorber 34 through the suction port 24a, compresses the refrigerant, and discharges the refrigerant to the heat pump 12. A refrigerant inlet 271a of a liquid heater 27 is connected to the discharge port 24b of the compressor 24.

The compressor 24 is an electric compressor. As a compression mechanism of the compressor 24, specifically, it is possible to employ various compression mechanisms such as a scroll compression mechanism and a vane compression mechanism.

Operation (specifically, a rotation speed) of an electric motor of the compressor 24 is controlled based on a control signal output from the electronic control unit 20 and an AC motor or a DC motor may be employed as the electric motor. Refrigerant discharge performance of the compressor 24 is changed by controlling the rotation speed of the electric motor.

The refrigerant radiator 26 is configured by the liquid heater 27. The liquid heater 27 serves as a heat exchanger that transfers heat of the refrigerant to the first liquid medium, which circulates in the first-liquid-medium circuit 14, by performing a heat exchange between the refrigerant and the first liquid medium. The liquid heater 27 is what is called a water-cooled condenser that causes the first liquid medium and the refrigerant to exchange heat with each other to thereby heat the first liquid medium and condense the refrigerant.

The liquid heater 27 includes a refrigerant flow unit 271 having the refrigerant inlet 271a and a refrigerant outlet 271b and a first liquid medium flow unit 272 having a liquid medium inlet 272a and a liquid medium outlet 272b in order to cause the first liquid medium and the refrigerant to exchange heat with each other. The refrigerant flow unit 271 and the first liquid medium flow unit 272 are configured integrally.

High-temperature high-pressure refrigerant flowing out of the compressor 24 flows into the refrigerant inlet 271a of the liquid heater 27 and the liquid heater 27 causes the refrigerant flowing into the refrigerant flow unit 271 from the compressor 24 and the first liquid medium flowing through the first liquid medium flow unit 272 to exchange heat with each other. In short, the liquid heater 27 causes the refrigerant flowing through the refrigerant flow unit 271 to dissipate heat to the first liquid medium to thereby condense the refrigerant. Then, the liquid heater 27 causes the refrigerant after the heat dissipation to flow out of the refrigerant outlet 271b. The refrigerant outlet 271b of the liquid heater 27 is connected to the pressure reducer 32.

The pressure reducer 32 is a temperature-sensitive mechanical expansion valve that is used for general purposes in an air conditioning device for a vehicle and reduces a pressure of and expands the refrigerant by using a mechanical mechanism. Specifically, the pressure reducer 32 reduces the pressure of the refrigerant flowing out of the refrigerant outlet 271b of the liquid heater 27 and causes the refrigerant to flow to a refrigerant inlet 351a of a liquid cooler 35. The pressure reducer 32 adjusts a throttle degree in order to reduce the pressure of and expand the refrigerant, based on a refrigerant temperature and a refrigerant pressure at a refrigerant outlet 351b of the liquid cooler 35. The pressure reducer 32 is connected to the refrigerant inlet 351a of the liquid cooler 35 and causes the refrigerant after the pressure reduction to flow to the refrigerant inlet 351a.

The refrigerant heat absorber 34 is configured by the liquid cooler 35. The liquid cooler 35 transfers heat of the second liquid medium, which circulates in the second-liquid-medium circuit 16, to the refrigerant by performing a heat exchange between the second liquid medium and the refrigerant. The liquid cooler 35 is what is called a chiller that causes the second liquid medium and the refrigerant to exchange heat with each other to thereby cool the second liquid medium and evaporate and vaporize the refrigerant.

The liquid cooler 35 includes a refrigerant flow unit 351 having the refrigerant inlet 351a and the refrigerant outlet 351b and a second liquid medium flow unit 352 having a liquid medium inlet 352a and a liquid medium outlet 352b in order to cause the second liquid medium and the refrigerant to exchange heat with each other. The refrigerant flow unit 351 and the second liquid medium flow unit 352 are configured integrally.

Low-pressure refrigerant flowing out of the pressure reducer 32 flows into the refrigerant inlet 351a of the liquid cooler 35 and the liquid cooler 35 causes the refrigerant flowing into the refrigerant flow unit 351 from the pressure reducer 32 and the second liquid medium flowing through the second liquid medium flow unit 352 to exchange heat with each other. In short, the liquid cooler 35 causes the refrigerant to absorb heat from the second liquid medium to thereby evaporate the refrigerant. Then, the liquid cooler 35 causes the refrigerant after the heat absorption to flow out of the refrigerant outlet 351b. The refrigerant outlet 351b of the liquid cooler 35 is connected to the suction port 24a of the compressor 24 and the compressor 24 draws the refrigerant flowing out of the refrigerant outlet 351b through the suction port 24a.

In the heat pump 12 configured as described above, the refrigerant discharged from the compressor 24 flows from the discharge port 24b of the compressor 24 and flows through the refrigerant flow unit 271 of the liquid heater 27, the pressure reducer 32, and the refrigerant flow unit 351 of the liquid cooler 35, to the suction port 24a of the compressor 24 in this order.

The first-liquid-medium circuit 14 is a liquid medium circuit that is connected to the cold body 22 according to operation of the circuit switching device 19. For example, if the first-liquid-medium circuit 14 is connected to the cold body 22, the cold body 22 provides and receives heat to and from the first liquid medium. The cold body 22 is a vehicle-mounted device that is to be heated or cooled and mounted to the vehicle.

For example, the cold body 22 in the present invention is a heat source that generates heat. Therefore, an engine, a motor for traveling, an inverter, an electric heater, or the like corresponds to the cold body 22 in the present embodiment.

As shown in FIG. 1, the first-liquid-medium circuit 14 is configured by a first water pump 38, a heater core 40, and the like.

The first water pump 38 is an electric pump having a rotation speed controlled by the electronic control unit 20. The first water pump 38 circulates the first liquid medium through the first-liquid-medium circuit 14. For example, the higher the rotation speed of the first water pump 38, the higher a flow rate of the first liquid medium circulating through the first-liquid-medium circuit 14 becomes. In other words, the first water pump 38 functions as a first flow rate increasing/decreasing device that increases or decreases the flow rate of the first liquid medium in the first-liquid-medium circuit 14.

Specifically, the first water pump 38 has a suction port 38a and a discharge port 38b, draws the first liquid medium into the first water pump 38 through the suction port 38a, and discharges the first liquid medium through the discharge port 38b. A liquid medium inlet 40a of the heater core 40 is connected to the discharge port 38b of the first water pump 38.

The heater core 40 is a heating heat exchanger that is provided in an air conditioning unit and heats the conditioned air AR1 blown out of the air conditioning unit, for example. The air conditioning unit is disposed in the vehicle compartment and performs air conditioning in the vehicle compartment. That is, the heater core 40 is a radiator that transfers heat of the first liquid medium to the conditioned air AR1 by performing a heat exchange between the first liquid medium and the conditioned air AR1.

Specifically, the heater core 40 has the liquid medium inlet 40a and a liquid medium outlet 40b. The first liquid medium discharged from the first water pump 38 flows into the liquid medium inlet 40a and the heater core 40 causes the first liquid medium flowing in from the first water pump 38 and the conditioned air AR1 flowing in the air conditioning unit to exchange heat with each other. By the heat exchange, the heater core 40 heats the conditioned air AR1 and cools the first liquid medium. Then, the heater core 40 causes the first liquid medium after the heat exchange to flow out of the liquid medium outlet 40b. The liquid medium outlet 40b of the heater core 40 is connected to the liquid medium inlet 272a of the liquid heater 27.

The first liquid medium flow unit 272 of the liquid heater 27 is provided to the first-liquid-medium circuit 14 and the first liquid medium flowing out of the liquid medium outlet 40b of the heater core 40 flows into the liquid medium inlet 272a of the liquid heater 27.

The liquid heater 27 causes the first liquid medium after the heat exchange with the refrigerant to flow out of the liquid medium outlet 272b. The liquid medium outlet 272b of the liquid heater 27 is connected to the suction port 38a of the first water pump 38 via a first switching valve 191 of the circuit switching device 19.

In the first-liquid-medium circuit 14 configured as described above, the first liquid medium circulates between the heater core 40 and the liquid heater 27. Therefore, the liquid heater 27 indirectly dissipates the heat of the refrigerant flowing through the refrigerant flow unit 271 into the conditioned air AR1 via the first liquid medium and the heater core 40.

The second-liquid-medium circuit 16 is a liquid medium circuit that is connected to the cold body 22 according to operation of the circuit switching device 19 and is a different liquid medium circuit from the above-described first-liquid-medium circuit 14. For example, if the second-liquid-medium circuit 16 is connected to the cold body 22, the cold body 22 provides and receives heat to and from the second liquid medium.

As shown in FIG. 1, the second-liquid-medium circuit 16 is configured by a second water pump 42, an outside-air heat absorber 44, and the like. Since the first-liquid-medium circuit 14 and the second-liquid-medium circuit 16 are provided separately, the second-liquid-medium circuit 16 is provided to be constantly independent of the first-liquid-medium circuit 14.

The second water pump 42 is an electric pump having a rotation speed controlled by the electronic control unit 20 and circulates the second liquid medium through the second-liquid-medium circuit 16. For example, the higher the rotation speed of the second water pump 42, the higher a flow rate of the second liquid medium circulating through the second-liquid-medium circuit 16 becomes. In other words, the second water pump 42 functions as a second flow rate increasing/decreasing device that increases or decreases the flow rate of the second liquid medium in the second-liquid-medium circuit 16.

Specifically, the second water pump 42 has a suction port 42a and a discharge port 42b, draws the second liquid medium into the second water pump 42 through the suction port 42a, and discharges the second liquid medium through the discharge port 42b. The liquid medium inlet 352a of the liquid cooler 35 is connected to the discharge port 42b of the second water pump 42.

The second liquid medium flow unit 352 of the liquid cooler 35 is provided to the second-liquid-medium circuit 16 and the second liquid medium discharged from the second water pump 42 flows into the liquid medium inlet 352a of the liquid cooler 35.

The liquid cooler 35 causes the second liquid medium after the heat exchange with the refrigerant to flow out through the liquid medium outlet 352b. The liquid medium outlet 352b of the liquid cooler 35 is connected to a liquid medium inlet 44a of the outside-air heat absorber 44.

The outside-air heat absorber 44 is an exterior heat exchanger that is located outside the vehicle compartment. The outside-air heat absorber 44 transfers heat of an outside air AR2, which is air outside the vehicle compartment, to the second liquid medium by performing a heat exchange between the outside air AR2 and the second liquid medium.

The air conditioning system 10 includes an exterior blower 46 and the exterior blower 46 blows the outside air AR2 to the outside-air heat absorber 44. The exterior blower 46 is an electric blower device having a rotation speed controlled by the electronic control unit 20. For example, the higher a rotation speed of the exterior blower 46, the higher a flow rate of the outside air AR2 supplied to the outside-air heat absorber 44 becomes. In other words, the exterior blower 46 functions as a flow rate increasing/decreasing device that increases or decreases the flow rate of the outside air AR2 supplied to the outside-air heat absorber 44.

Specifically, the outside-air heat absorber 44 has the liquid medium inlet 44*a* and a liquid medium outlet 44*b*. The second liquid medium flowing out of the liquid medium outlet 352*b* of the liquid cooler 35 flows into the liquid medium inlet 44*a* and the outside-air heat absorber 44 causes the second liquid medium flowing in through the second liquid medium flow unit 352 of the liquid cooler 35 and the outside air AR2 blown by the exterior blower 46 to exchange heat with each other. By the heat exchange, the outside-air heat absorber 44 cools the outside air AR2 and heats the second liquid medium. Then, the outside-air heat absorber 44 causes the second liquid medium after the heat exchange to flow out through the liquid medium outlet 44*b*. The liquid medium outlet 44*b* of the outside-air heat absorber 44 is connected to the suction port 42*a* of the second water pump 42 via a second switching valve 192 of the circuit switching device 19.

The cold body connecting flow path 18 is a liquid medium flow path that guides the first liquid medium and the second liquid medium to the cold body 22 and includes a first upstream flow path 181, a first downstream flow path 182, a second upstream flow path 183, and a second downstream flow path 184.

The circuit switching device 19 is a connection switching device that alternatively connects the cold body 22 to the first-liquid-medium circuit 14 or the second-liquid-medium circuit 16. In other words, the circuit switching device 19 is also configured to switch between a connection state in which the cold body 22 is connected to the first-liquid-medium circuit 14 and a disconnection state in which the cold body 22 is disconnected from the first-liquid-medium circuit 14. The circuit switching device 19 is also configured to switch between a connection state in which the cold body 22 is connected to the second-liquid-medium circuit 16 and a disconnection state in which the cold body 22 is disconnected from the second-liquid-medium circuit 16. When the circuit switching device 19 disconnects the cold body 22 from the second-liquid-medium circuit 16, the circuit switching device 19 connects the cold body 22 to the first-liquid-medium circuit 14. On the other hand, when the circuit switching device 19 connects the cold body 22 to the second-liquid-medium circuit 16, the circuit switching device 19 disconnects the cold body 22 from the first-liquid-medium circuit 14.

Here, connecting the cold body 22 to the first-liquid-medium circuit 14 or the second-liquid-medium circuit 16 means connecting the heat source to the first-liquid-medium circuit 14 or the second-liquid-medium circuit 16. That is, it means that a flow path defined in the cold body 22 communicates with the first-liquid-medium circuit 14 or the second-liquid-medium circuit 16 such that the liquid medium heated in the cold body 22 flows into the first-liquid-medium circuit 14 and the second-liquid-medium circuit 16. Therefore, when the cold body 22 is disconnected from the first-liquid-medium circuit 14 or the second-liquid-medium circuit 16, the liquid medium heated in the cold body 22 is stopped flowing into the first-liquid-medium circuit 14 or the second-liquid-medium circuit 16 regardless whether the flow path defined in the cold body 22 communicates with the first-liquid-medium circuit 14 or the second-liquid-medium circuit 16. For example, even when a small amount of liquid medium flows into the flow path in the cold body 22 for detection of a temperature of the cold body 22 while the cold body 22 is disconnected, it does not change the fact that the cold body 22 is disconnected.

The circuit switching device 19 includes the first switching valve 191, the second switching valve 192, a first three-way valve 193, and a second three-way valve 194.

The circuit switching device 19 is controlled by the electronic control unit 20. In other words, each of the four flow path switching valves 191 to 194 configuring the circuit switching device 19 is configured by an electric valve gear controlled by the electronic control unit 20.

The first switching valve 191 of the circuit switching device 19 is provided in a liquid medium passage extending from the liquid medium outlet 272*b* of the liquid heater 27 to the suction port 38*a* of the first water pump 38 in the first-liquid-medium circuit 14. The first switching valve 191 connects and disconnects the liquid medium outlet 272*b* of the liquid heater 27 and the suction port 38*a* of the first water pump 38 to and from each other.

The second switching valve 192 is provided in a liquid medium passage extending from the liquid medium outlet 44*b* of the outside-air heat absorber 44 to the suction port 42*a* of the second water pump 42 in the second-liquid-medium circuit 16. The second switching valve 192 connects and disconnects the liquid medium outlet 44*b* of the outside-air heat absorber 44 and the suction port 42*a* of the second water pump 42 to and from each other.

The first three-way valve 193 has a first port 193*a*, a second port 193*b*, and a third port 193*c*. The first port 193*a* is connected to the liquid medium outlet 272*b* of the liquid heater 27 by the first upstream flow path 181, the second port 193*b* is connected to the liquid medium outlet 44*b* of the outside-air heat absorber 44 by the second upstream flow path 183, and the third port 193*c* is connected to a liquid medium inlet 22*a* of the cold body 22. The first three-way valve 193 is alternatively switched between a first switching state in which the first port 193*a* communicates with the third port 193*c* while the second port 193*b* is closed and a second switching state in which the first port 193*a* is closed while the second port 193*b* communicates with the third port 193*c*.

The second three-way valve 194 has a first port 194*a*, a second port 194*b*, and a third port 194*c*. The first port 194*a* is connected to the suction port 38*a* of the first water pump 38 by the first downstream flow path 182, the second port 194*b* is connected to the suction port 42*a* of the second water pump 42 by the second downstream flow path 184, and the third port 193*c* is connected to a liquid medium outlet 22*b* of the cold body 22. The second three-way valve 194 is alternatively switched between a first switching state in which the first port 194*a* communicates with the third port 194*c* while the second port 194*b* is closed and a second switching state in which the first port 194*a* is closed while the second port 194*b* communicates with the third port 194*c*.

The cold body 22 has the liquid medium inlet 22*a* and the liquid medium outlet 22*b*. The cold body 22 itself is a cold source that provides and receives heat to and from the first or second liquid medium flowing in through the liquid medium inlet 22*a*. The cold body 22 provides and receives heat to and from the first or second liquid medium flowing in through the liquid medium inlet 22*a* and then causes the liquid medium to flow out through the liquid medium outlet 22*b*.

As shown in FIG. 1, the air conditioning system 10 includes a first-liquid-medium temperature sensor 48, a second-liquid-medium temperature sensor 50, a cold body temperature sensor 52, a second liquid medium flow rate sensor 54, a low-pressure-side refrigerant pressure sensor 56, and an outside-air temperature sensor 57. The outside-air temperature sensor 57 detects a temperature Ta of the outside air AR2.

Signals indicating detection values are successively input to the electronic control unit 20 from the sensors 48, 50, 52, 54, 56, and 57. The electronic control unit 20 successively outputs control signals to the compressor 24, the first water pump 38, and the second water pump 42, for example for controlling the compressor 24, the first water pump 38, and the second water pump 42.

The first-liquid-medium temperature sensor 48 detects a temperature TH of the first liquid medium circulating through the first-liquid-medium circuit 14. The temperature TH of the first liquid medium may be detected at any position of the first-liquid-medium circuit 14 as far as the position for detection is fixed. In the present embodiment, the first-liquid-medium temperature sensor 48 detects the temperature TH of the first liquid medium at the liquid medium inlet 272a of the liquid heater 27.

The second-liquid-medium temperature sensor 50 detects a temperature TL of the second liquid medium circulating through the second-liquid-medium circuit 16. The temperature TL of the second liquid medium may be detected at any position of the second-liquid-medium circuit 16 as far as the position for detection is fixed. In the present embodiment, the second-liquid-medium temperature sensor 50 detects the temperature TL of the second liquid medium at the liquid medium inlet 352a of the liquid cooler 35.

The cold body temperature sensor 52 detects a temperature Ts of the cold body 22. The temperature Ts of the cold body 22 may be measured at any position of the cold body 22. In the present embodiment, a temperature of the first liquid medium or the second liquid medium flowing through the cold body connecting flow path 18 is detected as the temperature Ts of the cold body 22. As shown in FIG. 1, for example, the cold body temperature sensor 52 detects the temperature of the first liquid medium or the second liquid medium at the liquid medium outlet 22b as the temperature Ts of the cold body 22.

The second liquid medium flow rate sensor 54 detects a flow rate Vwl of the second liquid medium flowing through the second-liquid-medium circuit 16, i.e., a flow rate Vwl of the second liquid medium. The flow rate Vwl of the second liquid medium may be detected at any position of the second-liquid-medium circuit 16 as far as the position for detection is fixed. In the present embodiment, the second liquid medium flow rate sensor 54 detects the flow rate Vwl of the second liquid medium at the discharge port 42b of the second water pump 42.

The low-pressure-side refrigerant pressure sensor 56 detects a low-pressure-side refrigerant pressure Ps after the pressure reduction in the pressure reducer 32 in the refrigeration cycle of the heat pump 12. The low-pressure-side refrigerant pressure Ps may be detected at any position of a refrigerant path from the pressure reducer 32 to the suction port 24a of the compressor 24. In the present embodiment, the low-pressure-side refrigerant pressure sensor 56 detects the low-pressure-side refrigerant pressure Ps between the pressure reducer 32 and the refrigerant inlet 351a of the liquid cooler 35.

The electronic control unit 20 shown in FIG. 1 is configured by a microcomputer including a CPU, a ROM, RAM, and the like (not shown). The signals from the sensors and the like connected to the electronic control unit 20 are input to the microcomputer after subjected to A/D conversion by means of an input circuit (not shown). The electronic control unit 20 functions as an air conditioning control device that performs various air conditioning controls. As one of the air conditioning controls, the electronic control unit 20 actuates the circuit switching device 19 to thereby perform a cold body switching control for alternatively connect the cold body 22 to the first-liquid-medium circuit 14 or the second-liquid-medium circuit 16.

Figure 2:
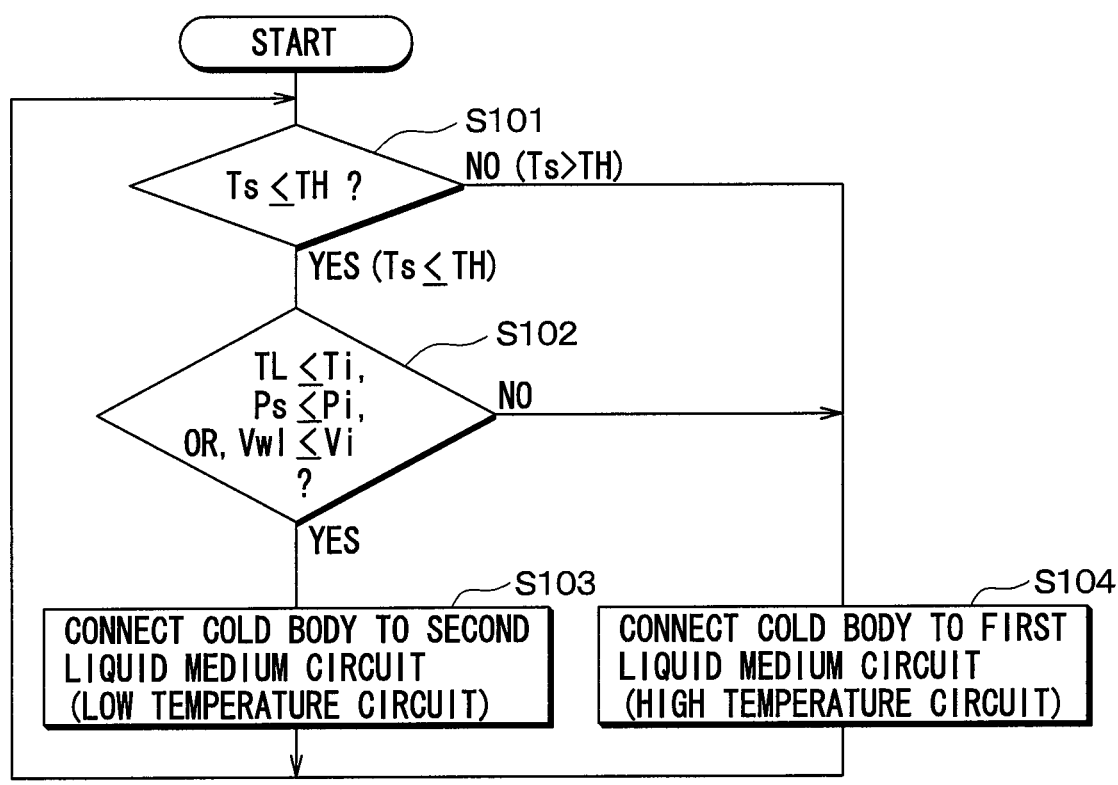
FIG. 2 is a flowchart illustrating control processing performed by an electronic control unit of an air conditioning system in the first embodiment.

FIG. 2 is a flowchart illustrating control processing for performing the cold body switching control. The electronic control unit 20 starts the control processing in FIG. 2 when an ignition switch of the vehicle is turned on, for example, and performs the control processing in FIG. 2 periodically and repeatedly. During the control processing in FIG. 2, air conditioning operation in which the compressor 24 operates and the conditioned air AR1 is blown out of the air conditioning unit is being performed and the first water pump 38, the second water pump 42, and the exterior blower 46 are operating, for example, unless otherwise specified. The same holds true for control processing performed in embodiments described later.

As shown in FIG. 2, the electronic control unit 20 first obtains the temperature Ts of the cold body 22 and the temperature TH of the first liquid medium at step S101. Then, the electronic control unit 20 determines whether the temperature Ts of the cold body 22 is not higher than the temperature TH of the first liquid medium.

If it is determined that the temperature Ts of the cold body 22 is not higher than the temperature TH of the first liquid medium at step S101, the electronic control unit 20 proceeds to step S102. On the other hand, if it is determined that the temperature Ts of the cold body 22 is higher than the temperature TH of the first liquid medium, the electronic control unit 20 proceeds to step S104.

At step S102, it is estimated whether the outside-air heat absorber 44 is frosted, i.e., whether a frost is formed on the outside-air heat absorber 44, based on a specified physical quantity. The specified physical quantity is one of the heat-related physical quantities and relates to heat in the outside-air heat absorber 44. For example, the specified physical quantity is the temperature TL of the second liquid medium, the low-pressure-side refrigerant pressure Ps, or the flow rate Vwl of the second liquid medium.

According to the present embodiment, it is estimated that the outside-air heat absorber 44 is frosted when the temperature TL of the second liquid medium is a threshold value Ti of the temperature TL or lower, when the low-pressure-side refrigerant pressure Ps is a threshold value Pi of the low-pressure-side refrigerant pressure Ps or lower, or when the flow rate Vwl of the second liquid medium is a threshold value Vi of a flow rate of the liquid medium. The threshold values Ti, Pi, Vi are determined in advance experimentally such that the electronic control unit 20 can determine whether the outside-air heat absorber 44 is frosted.

At step S102, it is estimated whether the outside-air heat absorber 44 is frosted by obtaining the temperature TL of the second liquid medium, the low-pressure-side refrigerant pressure Ps, and the flow rate Vwl of the second liquid medium.

The electronic control unit 20 advances to step S103 when estimating that the outside-air heat absorber 44 is frosted at step S102. On the other hand, the electronic control unit 20 advances to step S104 when estimating that the outside-air heat absorber 44 is not frosted at step S102.

At step S103, by actuating the circuit switching device 19, the electronic control unit 20 connects the cold body 22 to the second-liquid-medium circuit 16. If the cold body 22 is already connected to the second-liquid-medium circuit 16, the connection is maintained. Specifically, the first switching valve 191 is opened and the second switching valve 192 is closed in FIG. 1. Then, the first three-way valve 193 and the second three-way valve 194 are switched into the second switching states.

As a result, the first liquid medium does not flow to the cold body 22 and the first liquid medium discharged from the first water pump 38 flows from the discharge port 38b of the first water pump 38 and flows through the heater core 40, the first liquid medium flow unit 272 of the liquid heater 27, and the first switching valve 191 to the suction port 38a of the first water pump 38 in this order.

On the other hand, the second liquid medium discharged from the second water pump 42 flows from the discharge port 42b of the second water pump 42 and flows through the second liquid medium flow unit 352 of the liquid cooler 35, the outside-air heat absorber 44, the first three-way valve 193, the cold body 22, and the second three-way valve 194 to the suction port 42a of the second water pump 42 in this order. Therefore, heat of the cold body 22 is transferred to the second liquid medium. Indirectly, the heat of the cold body 22 is transferred to the refrigerant circulating through the heat pump 12 via the second liquid medium and the liquid cooler 35. The higher the flow rate of the second liquid medium is made by the second water pump 42, the larger a heat transfer amount between the cold body 22 and the second liquid medium becomes.

At step S104 in FIG. 2, by actuating the circuit switching device 19, the electronic control unit 20 connects the cold body 22 to the first-liquid-medium circuit 14. If the cold body 22 is already connected to the first-liquid-medium circuit 14, the connection is maintained. Specifically, the first switching valve 191 is closed and the second switching valve 192 is opened in FIG. 1. Then, the first three-way valve 193 and the second three-way valve 194 are switched into the first switching states.

As a result, the second liquid medium does not flow to the cold body 22 and the second liquid medium discharged from the second water pump 42 flows from the discharge port 42b of the second water pump 42 and flows through the second liquid medium flow unit 352 of the liquid cooler 35, the outside-air heat absorber 44, and the second switching valve 192 to the suction port 42a of the second water pump 42 in this order.

On the other hand, the first liquid medium discharged from the first water pump 38 flows from the discharge port 38b of the first water pump 38 and flows through the heater core 40, the first liquid medium flow unit 272 of the liquid heater 27, the first three-way valve 193, the cold body 22, and the second three-way valve 194 to the suction port 38a of the first water pump 38 in this order. Therefore, if the temperature Ts of the cold body 22 is higher than the temperature of the first liquid medium flowing into the cold body 22, the heat of the cold body 22 is transferred to the first liquid medium. Indirectly, the heat of the cold body 22 is transferred to the conditioned air AR1 passing through the heater core 40 via the first liquid medium and the heater core 40. The higher the flow rate of the first liquid medium is made by the first water pump 38, the larger a heat transfer amount between the cold body 22 and the first liquid medium becomes.

After step S103 or S104 in FIG. 2, the electronic control unit 20 returns to step S101 and the control processing in FIG. 2 starts from step S101 again.

The above-described processing in each step in FIG. 2 configures a function section that implements each function. The same holds true for flowcharts in FIGS. 5, 6, 8, 9, 11, 12, 14 to 16, 26, and 27 described later. Step S102 in FIG. 2 corresponds to an estimation section and steps S103 and S104 correspond to a switching control section.

According to the present embodiment described above, the first liquid medium that is caused to exchange heat with the refrigerant in the refrigerant radiator 26 circulates through the first-liquid-medium circuit 14 and the second liquid medium that is caused to exchange heat with the refrigerant in the refrigerant heat absorber 34 circulates through the second-liquid-medium circuit 16. The first-liquid-medium circuit 14 and the second-liquid-medium circuit 16 are connected to the cold body 22 according to the switching operation of the circuit switching device 19. Therefore, by provision and reception of the heat to and from the cold body 22 and the first or second liquid medium, it is possible to enhance the heating performance of the air conditioning system 10.

According to the present embodiment, as shown in FIG. 2, the electronic control unit 20 controls the circuit switching device 19 to switch between the connection state and the disconnection state based on the specified physical quantity relating to heat in the outside-air heat absorber 44. Specifically, the electronic control unit 20 controls the circuit switching device 19 to set the connection state in which the cold body 22 is connected to the second-liquid-medium circuit 16 when estimating that the outside-air heat absorber 44 is estimated based on the specified physical quantity. Therefore, the outside-air heat absorber 44 can be defrosted or a frosting of the outside-air heat absorber 44 can be suppressed by using the heat of the cold body 22.

The electronic control unit 20 may control the circuit switching device 19 to set the connection state in which the cold body 22 is connected to the second-liquid-medium circuit 16 before estimating that the outside-air heat absorber 44 is frosted based on the specified physical quantity for suppressing the frosting of the outside-air heat absorber 44.

In the heating operation of the air conditioning system 10, if the heating is performed by the heat pump operation only, performance is seriously insufficient, though an electricity consumption can be reduced. On the other hand, heating performed only by using the other heat source such as the electric heater consumes much electricity and a problem such as reduction in a range of an electric car, a plug-in hybrid vehicle, or the like may occur. Therefore, it is necessary to seek an optimum combination between the other heat source and the heat pump 12.

Figure 3:
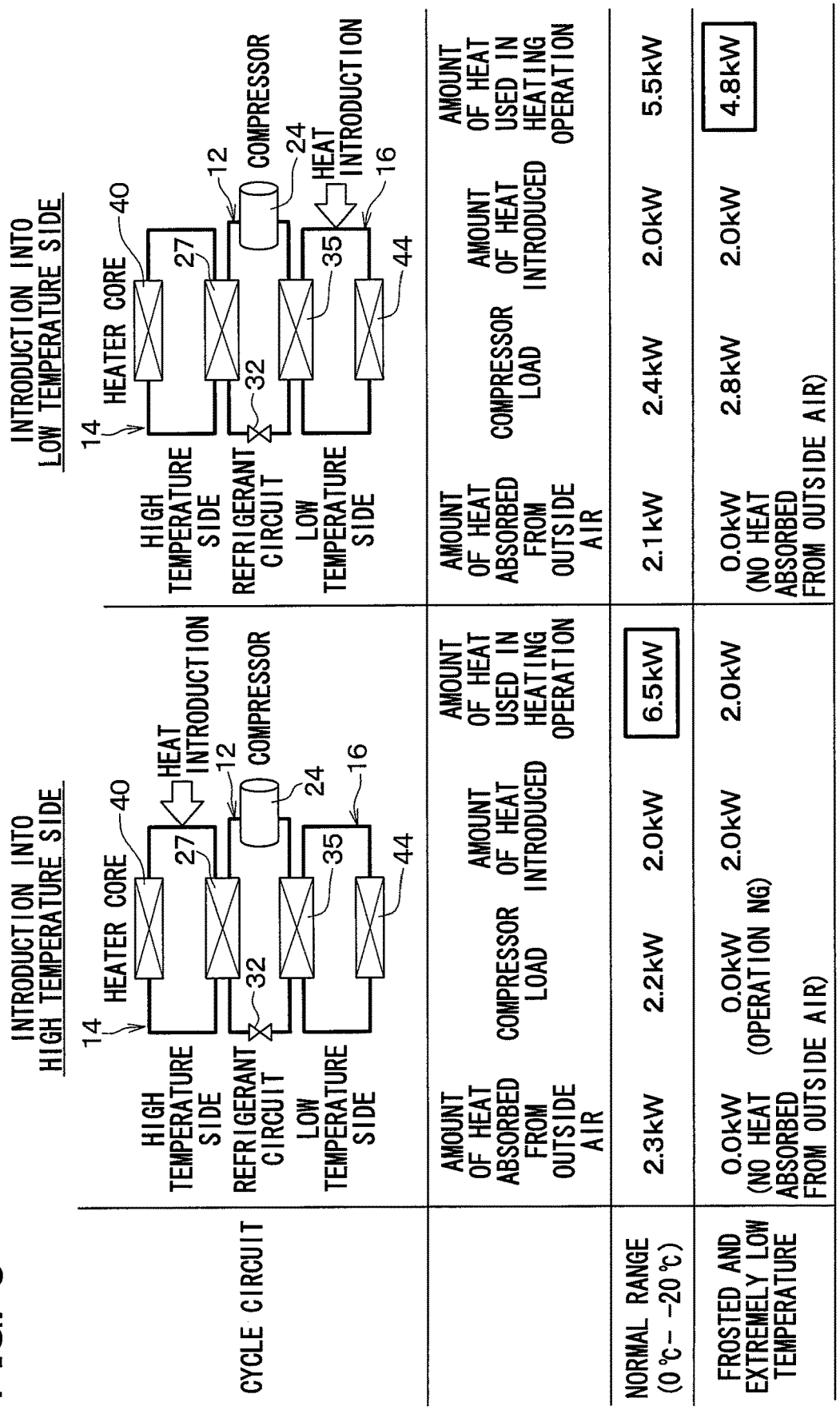
FIG. 3 is a diagram illustrating estimation results of heating heat quantities when an outside-air temperature is in a normal temperature range and an extremely low temperature range. The normal temperature range is from 0° C. to −20° C., and the extremely low temperature range is lower than or equal to −30° C. In the normal temperature range, an outside-air heat absorber is not frosted. In the extremely low temperature range, the outside-air heat absorber is frosted or the outside-air temperature is extremely low.

For example, in the present embodiment, estimation results shown in FIG. 3 were obtained. FIG. 3 is a diagram illustrating estimation results of heating heat quantities when an outside-air temperature is in a normal temperature range and an extremely low temperature range. The normal temperature range is from 0° C. to −20° C., and the extremely low temperature range is lower than or equal to −30° C. In the normal temperature range, the outside-air heat absorber 44 is not frosted. In the extremely low temperature range, the outside-air heat absorber 44 is frosted or the outside-air temperature is extremely low. In FIG. 3, the heating heat quantities when a heat quantity from the cold body 22 is introduced into the first-liquid-medium circuit 14 and when the heat quantity is introduced into the second-liquid-medium circuit 16 are estimated. In order to make the estimation simple, the heating heat quantities in FIG. 3 are estimated by ignoring a heat leak to the outside of the air conditioning system 10. The heating heat quantity is a heat quantity given to the conditioned air AR1 in the heater core 40.

As can be seen from FIG. 3, in the normal zone, a heating heat quantity increasing effect is higher when the heat of the cold body 22 is introduced to a high-temperature water circuit, i.e., the first-liquid-medium circuit 14 than when the heat is introduced to a low-temperature water circuit, i.e., the second-liquid-medium circuit 16. However, at the time of the extremely low temperature or the frost formation, i.e., when the temperature of the second liquid medium is close to a freezing point, a heating heat quantity increasing effect is higher when the heat of the cold body 22 is introduced to the second-liquid-medium circuit 16 than when the heat is introduced to the first-liquid-medium circuit 14.

Based on the estimation results shown in FIG. 3, the electronic control unit 20 controls the circuit switching device 19 to set the connection state in which the cold body 22 is connected to the first-liquid-medium circuit 14 when estimating that the frost is not formed on the outside-air heat absorber 44, thereby transferring the heat of the cold body 22 to the first liquid medium. On the other hand, the electronic control unit 20 controls the circuit switching device 10 to set the connection state in which the cold body 22 is connected to the second-liquid-medium circuit when estimating that the frost is formed on the outside-air heat absorber 44, thereby transferring the heat of the cold body 22 to the second liquid medium.

Therefore, it is possible to obtain a high heating heat quantity (see FIG. 3) increasing effect, as compared with a configuration in which a circuit switching device 19 is not provided and the cold body 22 stays connected to the first-liquid-medium circuit 14, for example. Moreover, as can be seen from FIG. 3, it is possible to avoid a stop of the heat pump 12, i.e., a stop of the compressor 24 at the time of the frost formation on the outside-air heat absorber 44 or the extremely low temperature, and thus it is possible to obtain a minimum heat quantity as the heating heat quantity.

As described above, the heat of the cold body 22 is transferred to the first liquid medium or the second liquid medium according to the switching operation of the circuit switching device 19. However, this is an example, and transfer destination of at least part of the heat dissipated by the cold body 22 to the first liquid medium and the second liquid medium may be alternatively switched between the first liquid medium and the second liquid medium according to the switching operation of the circuit switching device 19.

Second Embodiment

Next, a second embodiment will be described. In the present embodiment, differences from the above-described first embodiment will be mainly described. Portions which are the same as or equivalent to those in the above-described embodiment will not be described or will be described briefly. The same holds true for the embodiments described later.

Figure 4:
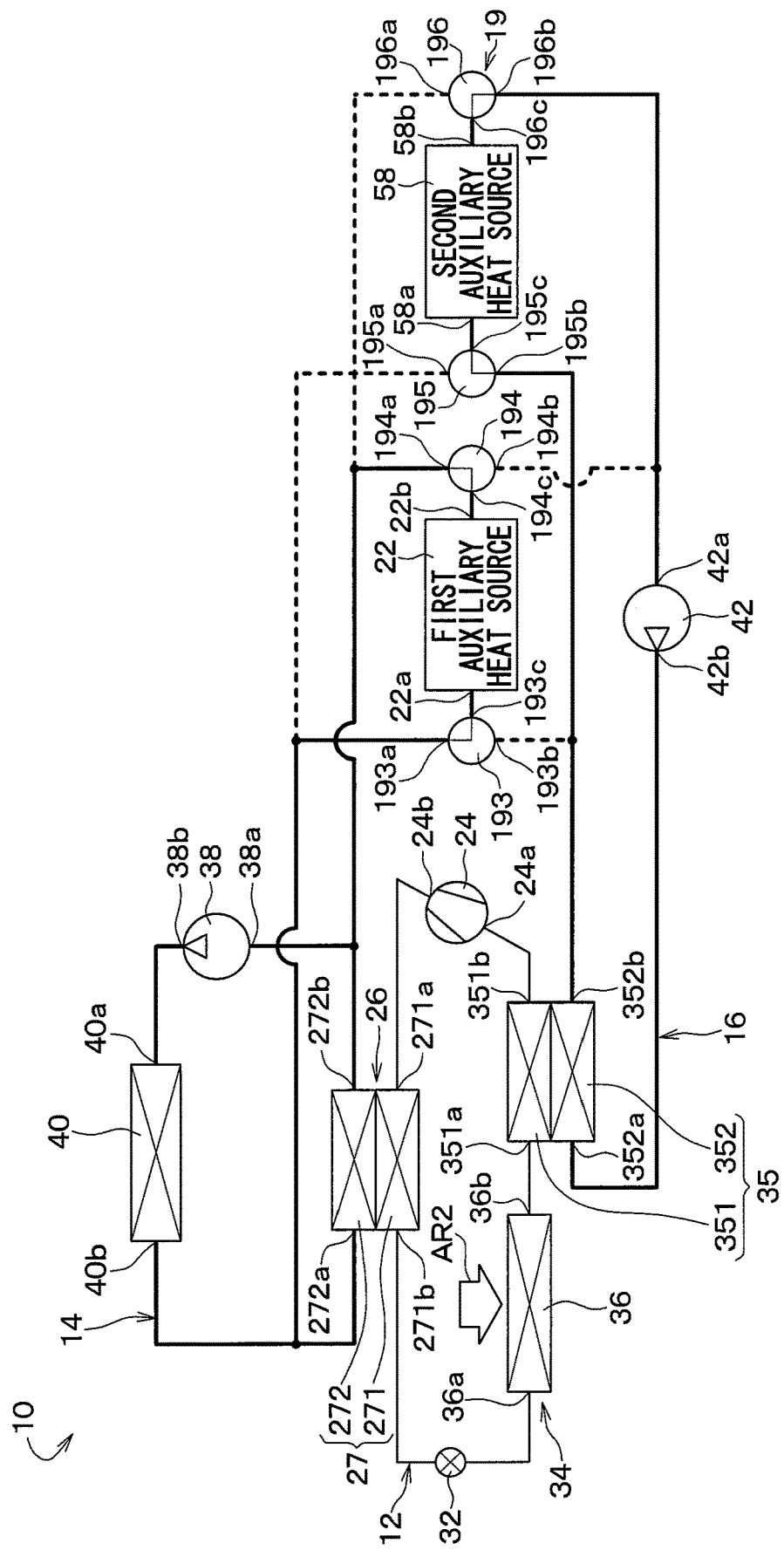
FIG. 4 is a circuit diagram illustrating a whole configuration of an air conditioning system in a second embodiment and is a diagram corresponding to FIG. 1 for the first embodiment.

FIG. 4 is a circuit diagram illustrating a whole configuration of an air conditioning system 10 in the present embodiment and is a diagram corresponding to FIG. 1 for the first embodiment. As shown in FIG. 4, in the present embodiment, two cold bodies 22 and 58 are provided, which is different from the first embodiment. A circuit switching device 19 and a refrigerant heat absorber 34 are also different from those in the first embodiment.

In the present embodiment, in the same way as in the first embodiment, a second-liquid-medium circuit 16 is provided separately from a first-liquid-medium circuit 14 and the same holds true for the embodiments described later.

One of two the cold bodies 22 and 58 will be referred to as first cold body 22 and the other as second cold body 58. Each of the first cold body 22 as a first heat source and the second cold body 58 as a second heat source is a heat source that generates heat and mounted to a vehicle similarly to the cold body 22 (see FIG. 1) in the first embodiment.

In the present embodiment, in the same way as in the first embodiment, the air conditioning system 10 includes an electronic control unit 20 and sensors, through the electronic control unit 20 and the sensors are not shown in FIG. 4. The same holds true for FIGS. 7, 10, and 13 described later.

Specifically, as shown in FIG. 4, the refrigerant heat absorber 34 of a heat pump 12 includes a refrigerant evaporator 36 connected in series to a refrigerant flow unit 351 of the liquid cooler 35, in addition to a liquid cooler 35. Although the refrigerant evaporator 36 can be disposed in the vehicle compartment, the refrigerant evaporator 36 is disposed outside the vehicle compartment in the present embodiment similarly to the outside-air heat absorber 44 (see FIG. 1) in the first embodiment. In other words, the refrigerant evaporator 36 is an exterior heat absorber that causes refrigerant to absorb heat from outside air AR2. The refrigerant evaporator 36 is provided on an upstream side of the refrigerant flow unit 351 of the liquid cooler 35 in a refrigerant flow direction and has a refrigerant inlet 36a and a refrigerant outlet 36b.

The refrigerant inlet 36a of the refrigerant evaporator 36 is connected to a pressure reducer 32 and the refrigerant outlet 36b of the refrigerant evaporator 36 is connected to a refrigerant inlet 351a of the liquid cooler 35. The refrigerant evaporator 36 transfers heat of the outside air AR2 passing through the refrigerant evaporator 36 to the refrigerant flowing through the refrigerant evaporator 36 by performing a heat exchange between the outside air AR2 and the refrigerant. In other words, the refrigerant evaporator 36 causes the refrigerant and the outside air AR2 to exchange heat with each other to thereby cool the outside air AR2 and evaporate the refrigerant. The refrigerant after the heat exchange flows from the refrigerant outlet 36b of the refrigerant evaporator 36 to the refrigerant inlet 351a of the liquid cooler 35.

Therefore, in the heat pump 12 of the present embodiment, the refrigerant discharged from a compressor 24 flows from a discharge port 24b of the compressor 24 and flows through a refrigerant flow unit 271 of a liquid heater 27, the pressure reducer 32, the refrigerant evaporator 36, and the refrigerant flow unit 351 of the liquid cooler 35 to the suction port 24a of the compressor 24 in this order.

In the first-liquid-medium circuit 14, a first liquid medium discharged from a first water pump 38 flows from a discharge port 38b of the first water pump 38 and flows through a heater core 40, and a first liquid medium flow unit 272 of the liquid heater 27 to a suction port 38a of the first water pump 38 in this order. According to switching by the circuit switching device 19, one or both of the first cold body 22 and the second cold body 58 is/are connected in parallel to the first liquid medium flow unit 272 of the liquid heater 27.

The first cold body 22 has a liquid medium inlet 22a into which the first liquid medium or the second liquid medium flows and a liquid medium outlet 22b from which the first liquid medium or the second liquid medium flows out. The second cold body 58 has a liquid medium inlet 58a into which the first liquid medium or the second liquid medium flows and a liquid medium outlet 58b from which the first liquid medium or the second liquid medium flows out.

The circuit switching device 19 includes a third three-way valve 195 and a fourth three-way valve 196 in addition to a first three-way valve 193 and a second three-way valve 194. However, as shown in FIG. 4, the circuit switching device 19 does not include the first switching valve 191 and the second switching valve 192 (see FIG. 1) unlike that in the first embodiment.

The third three-way valve 195 and the fourth three-way valve 196 are flow path switching valves similar to the first three-way valve 193 and the second three-way valve 194 and configured by electric valve mechanisms controlled by the electronic control unit 20. The third three-way valve 195 has a first port 195a, a second port 195b, and a third port 195c, and the fourth three-way valve 196 has a first port 196a, a second port 196b, and a third port 196c.

In the present embodiment, a first port 193a of the first three-way valve 193 is connected to a liquid medium passage of the first-liquid-medium circuit 14 extending from a liquid medium outlet 40b of the heater core 40 to a liquid medium outlet 272b of the liquid heater 27. A second port 193b of the first three-way valve 193 is connected to a liquid medium outlet 352b of the liquid cooler 35. A third port 193c of the first three-way valve 193 is connected to the liquid medium inlet 22a of the first cold body 22. The first three-way valve 193 is alternatively switched between the above-described first switching state and second switching state.

A first port 194a of the second three-way valve 194 is connected to a liquid medium passage of the first-liquid-medium circuit 14 extending from the liquid medium outlet 272b of the liquid heater 27 to the suction port 38a of the first water pump 38. A second port 194b of the second three-way valve 194 is connected to a suction port 42a of a second water pump 42. A third port 194c of the second three-way valve 194 is connected to the liquid medium outlet 22b of the first cold body 22. The second three-way valve 194 is alternatively switched between the above-described first switching state and second switching state.

The first port 195a of the third three-way valve 195 is connected to the liquid medium passage of the first-liquid-medium circuit 14 extending from the liquid medium outlet 40b of the heater core 40 to the liquid medium outlet 272b of the liquid heater 27. The second port 195b of the third three-way valve 195 is connected to the liquid medium outlet 352b of the liquid cooler 35. The third port 195c of the third three-way valve 195 is connected to the liquid medium inlet 58a of the second cold body 58. The third three-way valve 195 is alternatively switched between a first switching state in which the first port 195a communicates with the third port 195c and the second port 195b is closed and a second switching state in which the first port 195a is closed and the second port 195b communicates with the third port 195c.

The first port 196a of the fourth three-way valve 196 is connected to the liquid medium passage of the first-liquid-medium circuit 14 extending from the liquid medium outlet 272b of the liquid heater 27 to the suction port 38a of the first water pump 38. The second port 196b of the fourth three-way valve 196 is connected to the suction port 42a of the second water pump 42. The third port 196c of the fourth three-way valve 196 is connected to the liquid medium outlet 58b of the second cold body 58. The fourth three-way valve 196 is alternatively switched between a first switching state in which the first port 196a communicates with the third port 196c and the second port 196b is closed and a second switching state in which the first port 196a is closed and the second port 196b communicates with the third port 196c.

The electronic control unit 20 in the present embodiment performs a cold body switching control in the same way as in the first embodiment. However, the two cold bodies 22 and 58 are provided in the present embodiment and therefore control processing in FIG. 5 and control processing in FIG. 6 are repeatedly performed in parallel and periodically.

Figure 5:
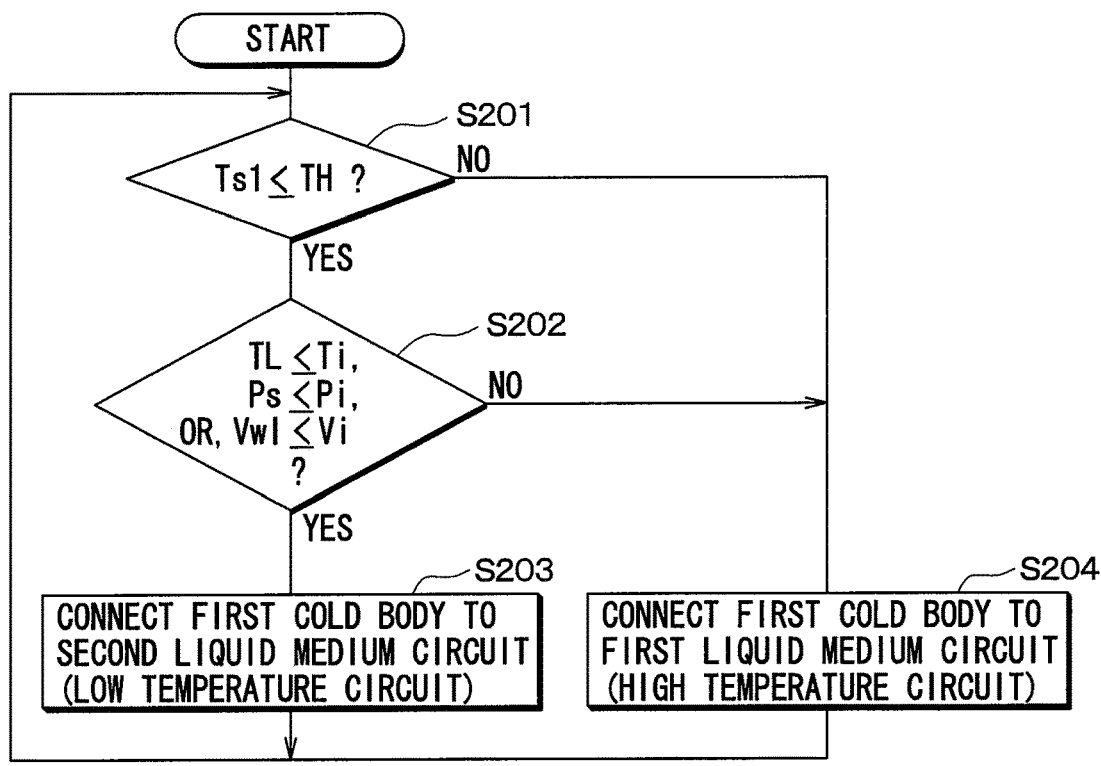
FIG. 5 is a flowchart illustrating control processing performed for a first cold body in the second embodiment and is a chart corresponding to FIG. 2 for the first embodiment.

FIG. 5 is a flowchart illustrating control processing for performing the cold body switching control for the first cold body 22 and is a chart corresponding to FIG. 2 for the first embodiment. FIG. 6 is a flowchart illustrating control processing for performing the cold body switching control for the second cold body 58 and is a chart corresponding to FIG. 2 for the first embodiment.

Figure 6:
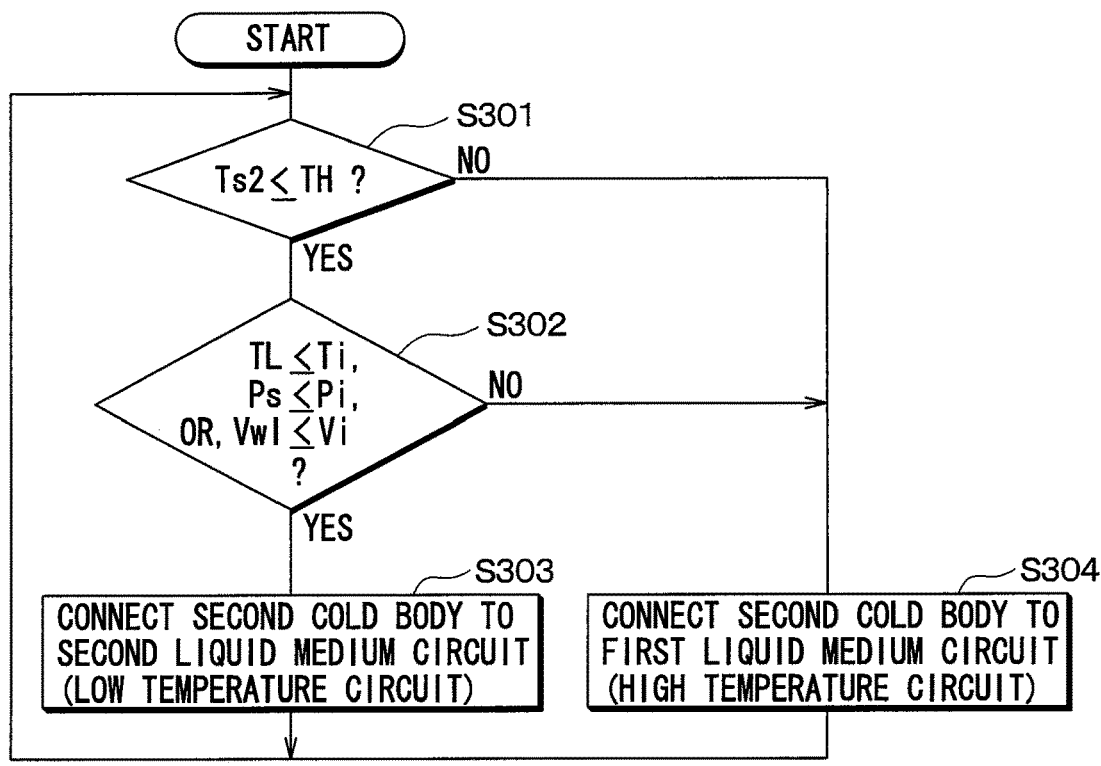
FIG. 6 is a flowchart illustrating control processing performed for a second cold body in the second embodiment and is a chart corresponding to FIG. 2 for the first embodiment.

The flowcharts in FIGS. 5 and 6 have the same configurations as the flowchart in FIG. 2. Specifically, step S201 in FIG. 5 and step S301 in FIG. 6 correspond to step S101 in FIG. 2, step S202 in FIG. 5 and step S302 in FIG. 6 correspond to step S102 in FIG. 2, step S203 in FIG. 5 and step S303 in FIG. 6 correspond to step S103 in FIG. 2, and step S204 in FIG. 5 and step S304 in FIG. 6 correspond to step S104 in FIG. 2. First, the control processing in FIG. 5 will be described.

The temperature Ts of the cold body 22 used at step S101 in FIG. 2 is replaced with a first temperature Ts of the cold body 221 at step S201 in FIG. 5, except for which step S201 is the same as step S101 in FIG. 2. The first temperature Ts of the cold body 221 is a temperature of the first cold body 22 in the present embodiment and detected similarly to the temperature Ts of the cold body 22 in the first embodiment, for example.

If it is determined that the first temperature Ts of the cold body 221 is equal to or lower than the temperature TH of the first liquid medium at step S201 in FIG. 5, the electronic control unit 20 proceeds to step S202. On the other hand, if it is determined that the first temperature Ts of the cold body 221 is higher than the temperature TH of the first liquid medium, the electronic control unit 20 proceeds to step S204.

Step S202 in FIG. 5 is the same as step S102 in FIG. 2. That is, it is estimated that the refrigerant evaporator 36 is frosted, i.e., a frost is formed on the refrigerant evaporator 36, based on the specified physical quantity. The specified physical quantity is the temperature TL of the second liquid medium, the low-pressure-side refrigerant pressure Ps, or the flow rate Vwl of the second liquid medium. According to the present embodiment, it is estimated that the refrigerant evaporator 36 is frosted when the temperature TL of the second liquid medium is a threshold value Ti of the temperature TL or lower, when the low-pressure-side refrigerant pressure Ps is a threshold value Pi of the low-pressure-side refrigerant pressure Ps or lower, or when the flow rate Vwl of the second liquid medium is a threshold value Vi of a flow rate of the liquid medium. The threshold values Ti, Pi, Vi are determined in advance experimentally such that the electronic control unit 20 can determine whether the refrigerant evaporator 36 is frosted. According to the present embodiment, the second water pump 42 is possibly stopped, and a determination based on the flow rate Vwl of the second liquid medium is not performed when the second water pump 42 is stopped.

The electronic control unit 20 advances to step S203 when the refrigerant evaporator 36 is estimated to be frosted at step S202. On the other hand, the electronic control unit 20 advances to step S204 when the refrigerant evaporator 36 is estimated not to be frosted at step S202.

At step S203, by actuating the circuit switching device 19, the electronic control unit 20 connects the first cold body 22 to the second-liquid-medium circuit 16. If the first cold body 22 is already connected to the second-liquid-medium circuit 16, the connection is maintained. Specifically, the first three-way valve 193 and the second three-way valve 194 shown in FIG. 4 are switched into the second switching states.

As a result, the first liquid medium does not flow to the first cold body 22. On the other hand, the second liquid medium discharged from the second water pump 42 flows from a discharge port 42b of the second water pump 42 and flows through the second liquid medium flow unit 352 of the liquid cooler 35, the first three-way valve 193, the first cold body 22, and the second three-way valve 194 to the suction port 42a of the second water pump 42 in this order. Therefore, heat of the first cold body 22 is transferred to the second liquid medium.

At step S204 in FIG. 5, by actuating the circuit switching device 19, the electronic control unit 20 connects the first cold body 22 to the first-liquid-medium circuit 14. If the first cold body 22 is already connected to the first-liquid-medium circuit 14, the connection is maintained. Specifically, the first three-way valve 193 and the second three-way valve 194 shown in FIG. 4 are switched into the first switching states.

As a result, the second liquid medium does not flow to the first cold body 22. On the other hand, the first cold body 22 is connected to the first-liquid-medium circuit 14 so as to be parallel to the first liquid medium flow unit 272 of the liquid heater 27. Part of the first liquid medium discharged from the heater core 40 flows from the liquid medium outlet 40b of the heater core 40 and flows through the first three-way valve 193, the first cold body 22, and the second three-way valve 194 to the suction port 38a of the first water pump 38 in this order. Therefore, if the first temperature Ts of the cold body 221 is higher than the temperature of the first liquid medium flowing into the first cold body 22, the heat of the first cold body 22 is transferred to the first liquid medium.

After step S203 or S204, the electronic control unit 20 returns to step S201 and starts the control processing in FIG. 5 from step S201 again.

Next, the control processing in FIG. 6 will be described. The control processing in FIG. 6 is basically the same as the control processing in FIG. 5. In other words, steps S301, S302, S303, and S304 in FIG. 6 are respectively the same as steps S201, S202, S203, and S204 in FIG. 5.

However, in the control processing in FIG. 6, the first cold body 22 in the control processing in FIG. 5 is replaced with the second cold body 58, the first three-way valve 193 is replaced with the third three-way valve 195, the second three-way valve 194 is replaced with the fourth three-way valve 196, and the first temperature Ts of the cold body 221 is replaced with a second temperature Ts of the cold body 222. The second temperature Ts of the cold body 222 is a temperature of the second cold body 58 in the present embodiment and detected similarly to the temperature Ts of the cold body 22 in the first embodiment, for example.

If all of the first to fourth three-way valves 193, 194, 195, and 196 shown in FIG. 4 are switched into the first switching states, the second liquid medium can flow into neither of the two cold bodies 22 and 58 and therefore the second water pump 42 is stopped. Steps S203 and S204 in FIG. 5 and steps S303 and S304 in FIG. 6 correspond to switching control sections.

In the present embodiment, in the same way as in the above-described first embodiment, it is possible to obtain effects exerted by the same configuration as that in the first embodiment.

Third Embodiment

Next, a third embodiment will be described. In the present embodiment, differences from the above-described second embodiment will be mainly described.

Figure 7:
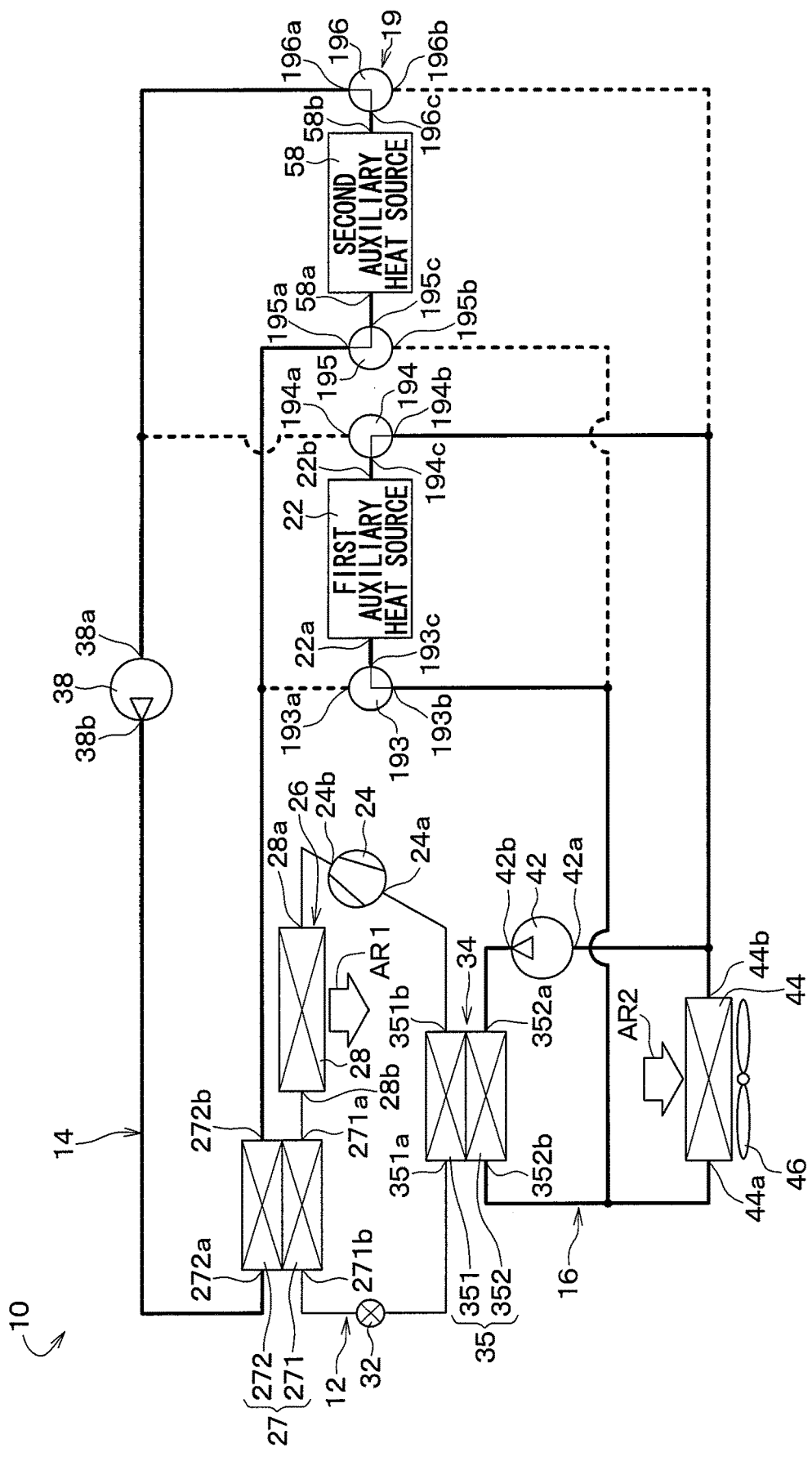
FIG. 7 is a circuit diagram illustrating a whole configuration of an air conditioning system in a third embodiment and is a diagram corresponding to FIG. 4 for the second embodiment.

FIG. 7 is a circuit diagram illustrating a whole configuration of an air conditioning system 10 in the present embodiment and is a diagram corresponding to FIG. 4 for the second embodiment. As shown in FIG. 7, the present embodiment is different from the second embodiment in a refrigerant radiator 26 and a refrigerant heat absorber 34 of a heat pump 12. Moreover, three-way valves 193, 194, 195, and 196 are connected to respective different points from those in the second embodiment.

Specifically, as shown in FIG. 7, the refrigerant radiator 26 included in the heat pump 12 in the present embodiment includes a condenser 28 connected in series to a refrigerant flow unit 271 of the liquid heater 27, in addition to a liquid heater 27. The condenser 28 is provided in the above-described air conditioning unit similarly to the heater core 40 (see FIG. 1) in the first embodiment. The condenser 28 is provided on an upstream side of the refrigerant flow unit 271 of the liquid heater 27 in a refrigerant flow direction and has a refrigerant inlet 28a and a refrigerant outlet 28b.

The refrigerant inlet 28a of the condenser 28 is connected to a discharge port 24b of a compressor 24 and the refrigerant outlet 28b of the condenser 28 is connected to a refrigerant inlet 271a of the liquid heater 27. The condenser 28 is an interior radiator that transfers heat of the refrigerant flowing therein and the conditioned air AR1 passing therethrough by performing a heat exchange between the conditioned air AR1 and the refrigerant. In other words, the condenser 28 causes the refrigerant and the conditioned air AR1 to exchange heat with each other to thereby heat the conditioned air AR1 and condense the refrigerant. The refrigerant after the heat exchange flows from the refrigerant outlet 28b of the condenser 28 toward the refrigerant inlet 271a of the liquid heater 27.

A first-liquid-medium circuit 14 in FIG. 7 does not include a heater core 40 and first liquid medium discharged from a first water pump 38 flows into a first liquid medium flow unit 272 of the liquid heater 27.

The refrigerant heat absorber 34 included in the heat pump 12 in the present embodiment includes a liquid cooler 35 and does not include a refrigerant evaporator 36 (see FIG. 4) similarly to the refrigerant heat absorber 34 in the first embodiment shown in FIG. 1. Therefore, a second-liquid-medium circuit 16 in FIG. 7 includes an outside-air heat absorber 44 similarly to the second-liquid-medium circuit 16 in the first embodiment.

Therefore, in the heat pump 12 in the present embodiment, the refrigerant discharged from the compressor 24 flows from the discharge port 24b of the compressor 24 and flows through the condenser 28, the refrigerant flow unit 271 of the liquid heater 27, a pressure reducer 32, and a refrigerant flow unit 351 of the liquid cooler 35, to the suction port 24a of the compressor 24 in this order.

In the second-liquid-medium circuit 16, the second liquid medium discharged from a second water pump 42 flows from a discharge port 42b of the second water pump 42 and flows through a second liquid medium flow unit 352 of the liquid cooler 35, and the outside-air heat absorber 44 to a suction port 42a of the second water pump 42 in this order. According to switching of a circuit switching device 19, one or both of a first cold body 22 and a second cold body 58 is/are connected in parallel to the outside-air heat absorber 44.

In the present embodiment, a first port 193*a* of the first three-way valve 193 is connected to a liquid medium outlet 272*b* of the liquid heater 27. A second port 193*b* of the first three-way valve 193 is connected to a liquid medium passage of the second-liquid-medium circuit 16 extending from a liquid medium outlet 352*b* of the liquid cooler 35 to a liquid medium inlet 44*a* of the outside-air heat absorber 44. A third port 193*c* of the first three-way valve 193 is connected to a liquid medium inlet 22*a* of the first cold body 22.

A first port 194*a* of the second three-way valve 194 is connected to a suction port 38*a* of the first water pump 38. A second port 194*b* of the second three-way valve 194 is connected to a liquid medium passage extending from a liquid medium outlet 44*b* of the outside-air heat absorber 44 to the suction port 42*a* of the second water pump 42. A third port 194*c* of the second three-way valve 194 is connected to a liquid medium outlet 22*b* of the first cold body 22.

A first port 195*a* of the third three-way valve 195 is connected to the liquid medium outlet 272*b* of the liquid heater 27. A second port 195*b* of the third three-way valve 195 is connected to the liquid medium passage of the second-liquid-medium circuit 16 extending from the liquid medium outlet 352*b* of the liquid cooler 35 to the liquid medium inlet 44*a* of the outside-air heat absorber 44. A third port 195*c* of the third three-way valve 195 is connected to a liquid medium inlet 58*a* of the second cold body 58.

A first port 196*a* of the fourth three-way valve 196 is connected to the suction port 38*a* of the first water pump 38. A second port 196*b* of the fourth three-way valve 196 is connected to the liquid medium passage extending from the liquid medium outlet 44*b* of the outside-air heat absorber 44 to the suction port 42*a* of the second water pump 42. A third port 196*c* of the fourth three-way valve 196 is connected to a liquid medium outlet 58*b* of the second cold body 58.

The first three-way valve 193 in the present embodiment is switched into a disconnected state in addition to a first switching state and a second switching state. In the disconnected state, all of the ports 193*a*, 193*b*, and 193*c* are closed and disconnected from each other. The same holds true for the second to fourth three-way valves 194, 195, and 196.

Figure 8:
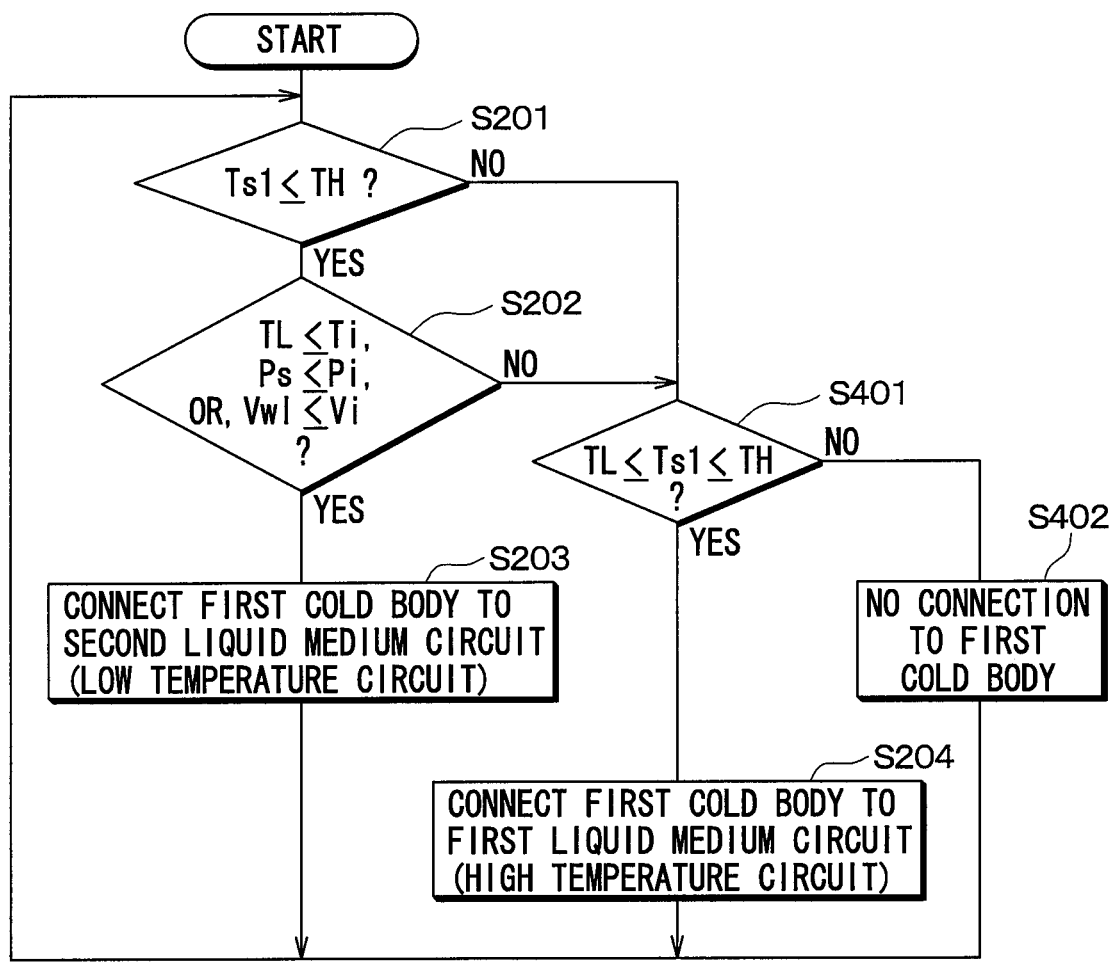
FIG. 8 is a flowchart illustrating control processing performed for a first cold body in the third embodiment and is a chart corresponding to FIG. 5 for the second embodiment.
Figure 9:
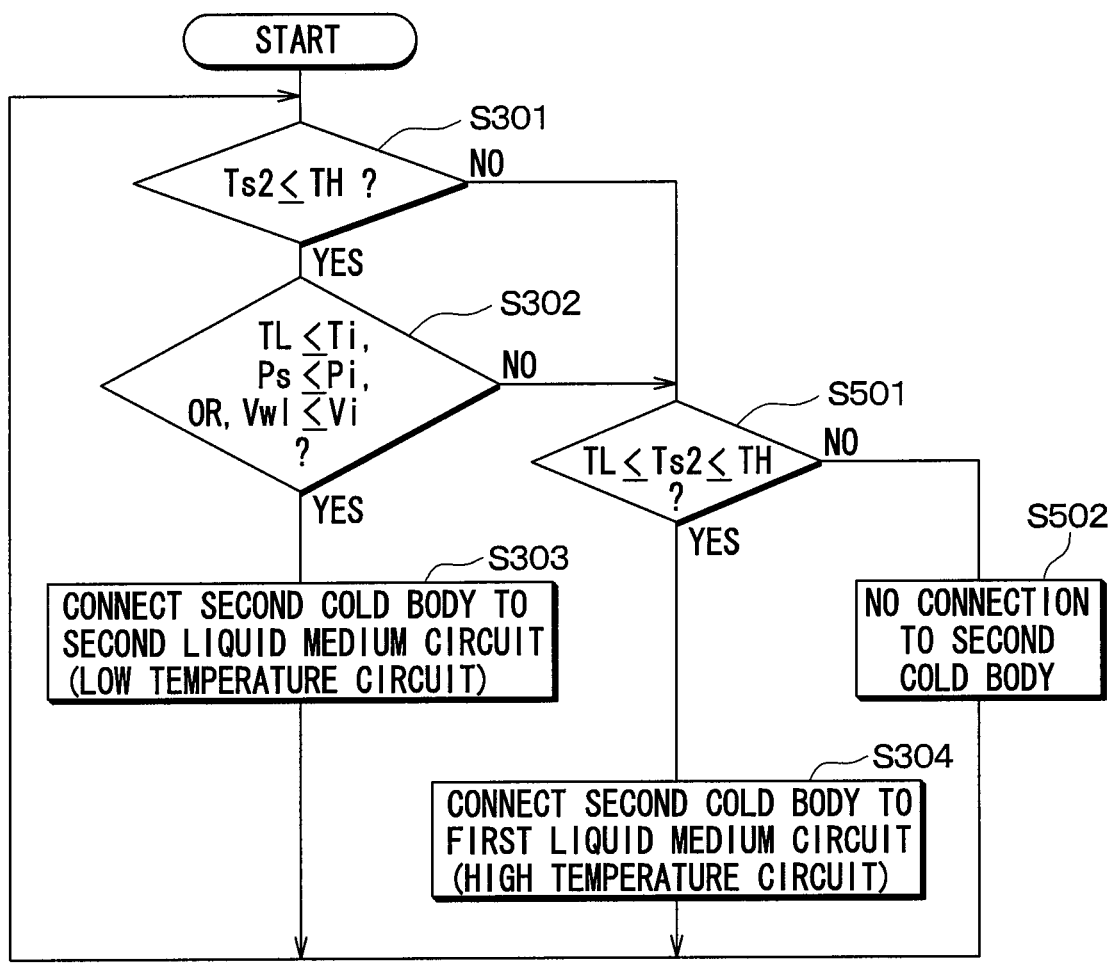
FIG. 9 is a flowchart illustrating control processing performed for a second cold body in the third embodiment and is a chart corresponding to FIG. 6 for the second embodiment.

An electronic control unit 20 in the present embodiment performs cold body switching controls by means of control processing in FIGS. 8 and 9 in the same way as in the above-described second embodiment. FIG. 8 is a flowchart illustrating the control processing for performing the cold body switching control for the first cold body 22 and is a chart corresponding to FIG. 5 for the second embodiment. FIG. 9 is a flowchart illustrating the control processing for performing the cold body switching control for the second cold body 58 and is a chart corresponding to FIG. 6 for the second embodiment.

Steps S201, S202, S203, and S204 in FIG. 8 are respectively the same as steps S201, S202, S203, and S204 in FIG. 5. Steps S301, S302, S303, and S304 in FIG. 9 are respectively the same as steps S301, S302, S303, and S304 in FIG. 6. The flowchart in FIG. 8 includes steps S401 and S402, which are different from FIG. 5. The flowchart in FIG. 9 includes steps S501 and S502, which is different from FIG. 6. Differences of FIGS. 8 and 9 from FIGS. 5 and 6 will be described. According to the present embodiment, the outside-air heat absorber 44 shown in FIG. 7 is mounted instead of the refrigerant evaporator 36 shown in FIG. 4. Therefore, it is estimated whether the outside-air heat absorber 44 is frosted at step S202 shown in FIG. 8 and step S302 shown in FIG. 9.

First, FIG. 8 will be described. The electronic control unit 20 advances to step S401 when a temperature Ts1 of the first cold body 22 is determined to be higher than the temperature TH of the first liquid medium at step S201 or when the outside-air heat absorber 44 is determined not to be frosted at step S202.

At step S401, it is determined whether the temperature Ts1 of the first cold body 22 is higher than or equal to the temperature TL of the second liquid medium and lower than or equal to the temperature TH of the first liquid medium.

If it is determined that the first temperature Ts of the cold body 221 is the temperature not lower than the temperature TL of the second liquid medium and not higher than the temperature TH of the first liquid medium at step S401, the electronic control unit 20 proceeds to step S204. On the other hand, if it is determined that the first temperature Ts of the cold body 221 is lower than the temperature TL of the second liquid medium or if it is determined that the first temperature Ts of the cold body 221 is higher than the temperature TH of the first liquid medium, the electronic control unit 20 proceeds to S402.

At step S203 in FIG. 8, in the same way as in the second embodiment, the first three-way valve 193 and the second three-way valve 194 are switched into the second switching states.

As a result, the first liquid medium does not flow to the first cold body 22. On the other hand, the first cold body 22 is connected to the second-liquid-medium circuit 16 so as to be parallel to the outside-air heat absorber 44. Part of the second liquid medium flowing out of the second liquid medium flow unit 352 of the liquid cooler 35 flows from the liquid medium outlet 352*b* of the liquid cooler 35 and flows through the first three-way valve 193, the first cold body 22, and the second three-way valve 194 to the suction port 42*a* of the second water pump 42 in this order. Therefore, heat of the first cold body 22 is transferred to the second liquid medium.

At step S204, in the same way as in the second embodiment, the first three-way valve 193 and the second three-way valve 194 are switched into the first switching states.

As a result, the second liquid medium does not flow to the first cold body 22. On the other hand, the first liquid medium discharged from the first water pump 38 flows from a discharge port 38*b* of the first water pump 38 and flows through the first liquid medium flow unit 272 of the liquid heater 27, the first three-way valve 193, the first cold body 22, and the second three-way valve 194 to the suction port 38*a* of the first water pump 38 in this order. Therefore, heat of the first liquid medium is transferred to the first cold body 22.

At step S402, the first cold body 22 is connected to neither of the first-liquid-medium circuit 14 and the second-liquid-medium circuit 16. Specifically, the first three-way valve 193 and the second three-way valve 194 are switched into the disconnected states.

After step S203, S204, or S402, the electronic control unit 20 returns to step S201 and the control processing in FIG. 8 starts from step S201 again.

Next, the control processing in FIG. 9 will be described. The control processing in FIG. 9 is basically the same as that in FIG. 8. In other words, steps S301, S302, S303, S304, S501, and S502 in FIG. 9 are respectively the same as steps S201, S202, S203, S204, S401, and S402 in FIG. 8.

However, in the control processing in FIG. 9, the first cold body 22 in the control processing in FIG. 8 is replaced with the second cold body 58, the first three-way valve 193 is replaced with the third three-way valve 195, the second three-way valve 194 is replaced with the fourth three-way valve 196, and the first temperature Ts of the cold body 221 is replaced with the second temperature Ts of the cold body 222.

If all of the first to fourth three-way valves 193, 194, 195, and 196 are switched into the second switching states or the disconnected states, the first liquid medium can flow into neither of the two cold bodies 22 and 58 and therefore the first water pump 38 is stopped. Step S202 in FIG. 8 and step S302 in FIG. 9 correspond to estimation sections and steps S203 and S204 in FIG. 8 and steps S303 and S304 in FIG. 9 correspond to switching control sections.

In the present embodiment, in the same way as in the above-described first embodiment, it is possible to obtain effects exerted by the same configuration as that in the first embodiment.

Fourth Embodiment

Next, a fourth embodiment will be described. In the present embodiment, differences from the above-described first embodiment will be mainly described.

Figure 10:
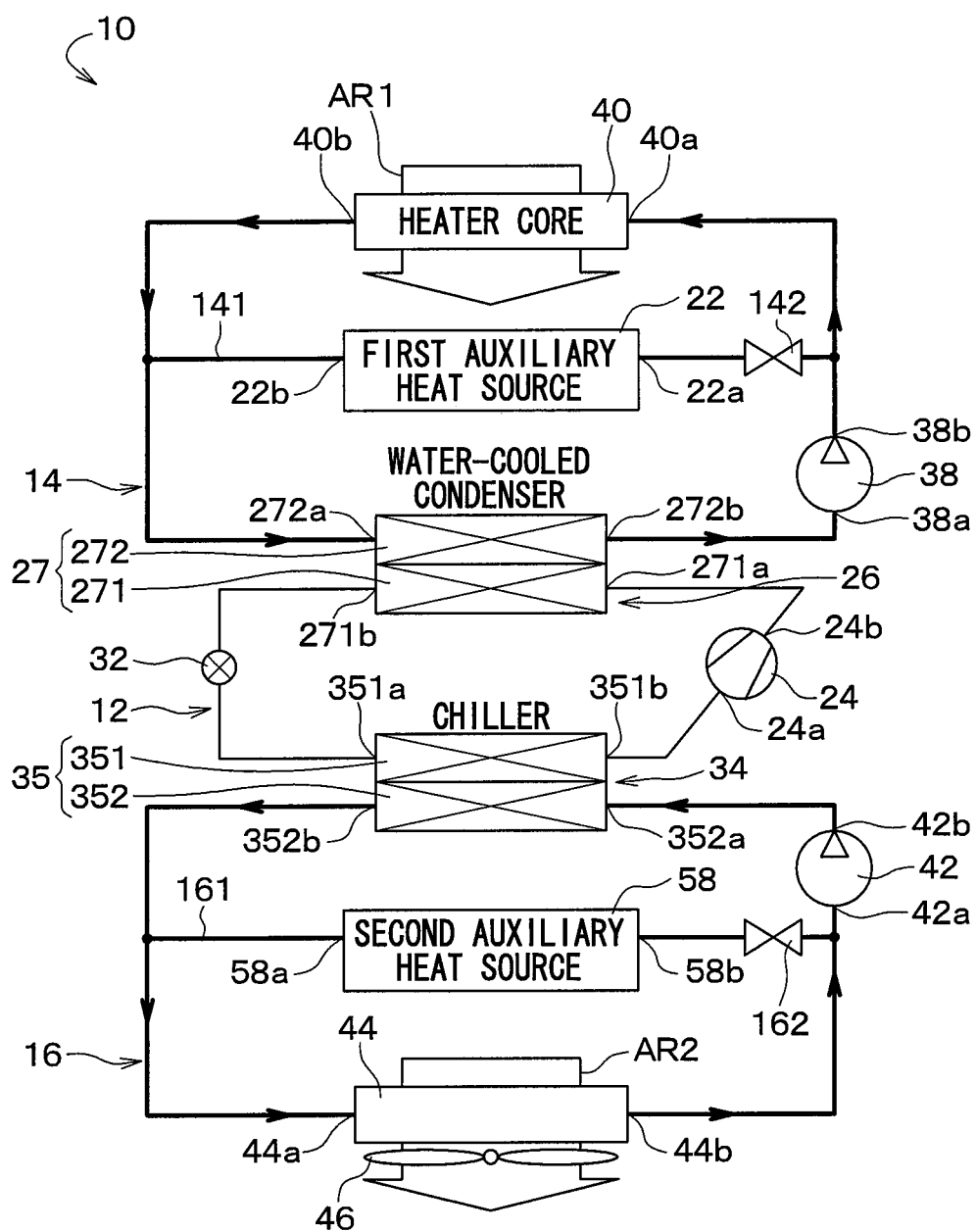
FIG. 10 is a circuit diagram illustrating a whole configuration of an air conditioning system in a fourth embodiment and is a diagram corresponding to FIG. 1 for the first embodiment.

FIG. 10 is a circuit diagram illustrating a whole configuration of an air conditioning system 10 in the present embodiment and is a diagram corresponding to FIG. 1 for the first embodiment. As shown in FIG. 10, the air conditioning system 10 in the present embodiment includes two cold bodies 22 and 58, i.e., a first cold body 22 and a second cold body 58. A cold body connecting flow path 18 and a circuit switching device 19 are not provided. These are differences of the present embodiment from the first embodiment.

Specifically, as shown in FIG. 10, a first-liquid-medium circuit 14 in the present embodiment includes a first heat-source flow path 141 that causes first liquid medium to flow to the first cold body 22 and a first switching valve 142, in addition to a first water pump 38 and a heater core 40.

The first heat-source flow path 141 is connected in parallel to the heater core 40 and the first cold body 22 is provided to the first heat-source flow path 141. In other words, the first cold body 22 is connected in parallel to the heater core 40 in the first-liquid-medium circuit 14.

The first switching valve 142 in the first-liquid-medium circuit 14 is an switching valve controlled by an electronic control unit 20, for example. The first switching valve 142 is provided to the first heat-source flow path 141 and opens/closes the first heat-source flow path 141 under control of the electronic control unit 20.

If the first switching valve 142 is open in the first-liquid-medium circuit 14 formed in this manner, the first liquid medium discharged from the first water pump 38 flows to both of the heater core 40 and the first cold body 22. Then, the first liquid medium flowing out of each of the heater core 40 and the first cold body 22 flows into a suction port 38a of the first water pump 38 via a first liquid medium flow unit 272 of a liquid heater 27. The first liquid medium circulating in this manner is heated in the first cold body 22 and the first liquid medium flow unit 272 of the liquid heater 27 and conditioned air AR1 is heated by the first liquid medium in the heater core 40.

On the other hand, if the first switching valve 142 is closed, the first liquid medium is circulated by the first water pump 38 between the heater core 40 and the first liquid medium flow unit 272 of the liquid heater 27.

A second-liquid-medium circuit 16 in the present embodiment includes a second heat-source flow path 161 that causes second liquid medium to flow to the second cold body 58, and a second switching valve 162, in addition to a second water pump 42 and an outside-air heat absorber 44.

The second heat-source flow path 161 is connected in parallel to the outside-air heat absorber 44 and the second cold body 58 is provided to the second heat-source flow path 161. In other words, the second cold body 58 is connected in parallel to the outside-air heat absorber 44 in the second-liquid-medium circuit 16.

The second switching valve 162 in the second-liquid-medium circuit 16 is an switching valve controlled by the electronic control unit 20, for example. The second switching valve 162 is provided to the second heat-source flow path 161 and opens/closes the second heat-source flow path 161 under control of the electronic control unit 20.

If the second switching valve 162 is open in the first-liquid-medium circuit 16 configured in this manner, the second liquid medium discharged from the second water pump 42 flows to a second liquid medium flow unit 352 of a liquid cooler 35. The second liquid medium flowing out of the second liquid medium flow unit 352 flows to both of the outside-air heat absorber 44 and the second cold body 58 and flows from each of the outside-air heat absorber 44 and the second cold body 58 to a suction port 42a of the second water pump 42. The second liquid medium circulating in this manner is heated in the second cold body 58 and the outside-air heat absorber 44 and then flows to the liquid cooler 35. Therefore, a heat quantity of the second cold body 58 is absorbed by the refrigerant in the liquid cooler 35 and eventually utilized for heating by operations of a heat pump 12 and the first water pump 38.

On the other hand, if the second switching valve 162 is closed, the second liquid medium is circulated by the second water pump 42 between the outside-air heat absorber 44 and the second liquid medium flow unit 352 of the liquid cooler 35.

Figure 11:
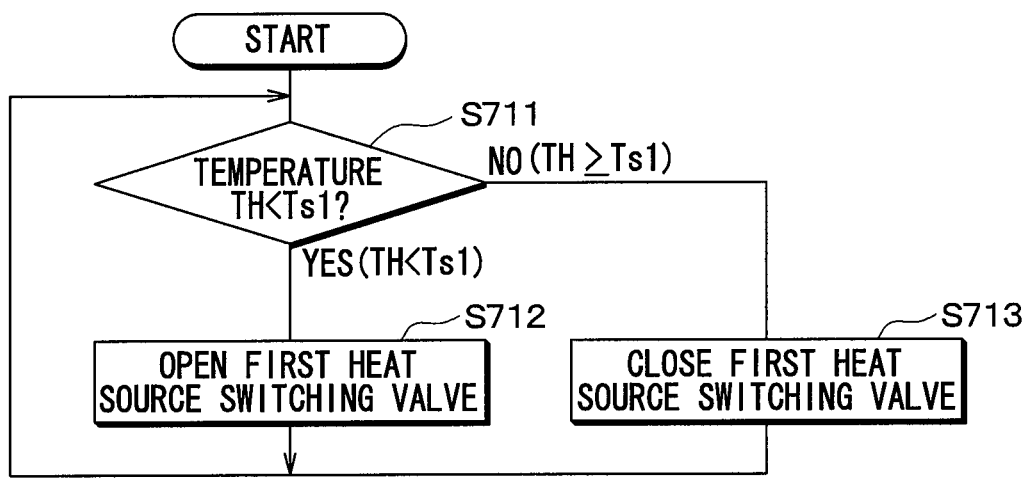
FIG. 11 is a flowchart illustrating control processing for actuating a first switching valve in the fourth embodiment and is a chart corresponding to FIG. 2 for the first embodiment.
Figure 12:
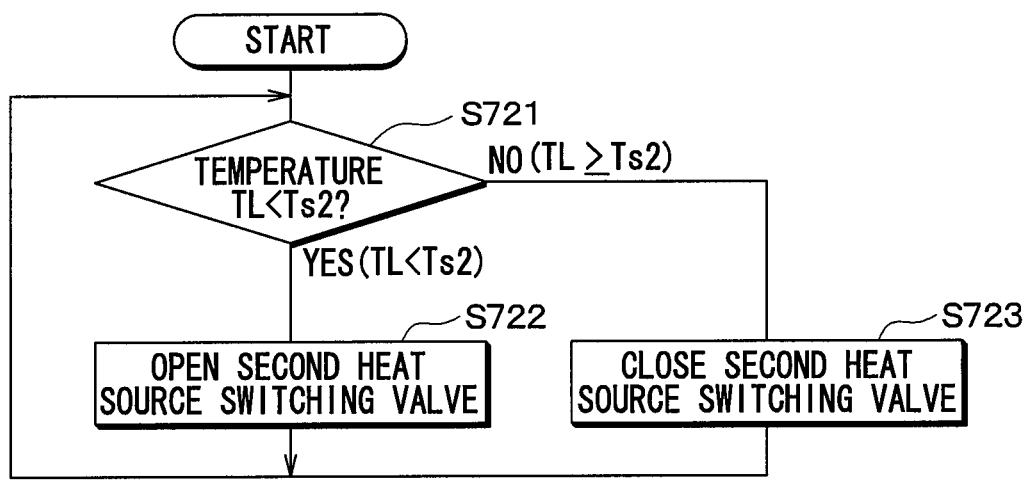
FIG. 12 is a flowchart illustrating control processing for actuating a second switching valve in the fourth embodiment and is a chart corresponding to FIG. 2 for the first embodiment.

FIG. 11 is a flowchart illustrating control processing for actuating the first switching valve 142 and is a chart corresponding to FIG. 2 for the first embodiment. FIG. 12 is a flowchart illustrating control processing for actuating the second switching valve 162 and is a chart corresponding to FIG. 2 for the first embodiment. The electronic control unit 20 in the present embodiment periodically and repeatedly performs the control processing in FIG. 11 and the control processing in FIG. 12 in parallel. The control processing in FIG. 11 and the control processing in FIG. 12 are performed separately from each other.

As shown in FIG. 11, the electronic control unit 20 first determines whether a temperature TH of the first liquid medium is lower than a first temperature Ts of the cold body 221 at step S711. The temperature TH of the first liquid medium may be detected at any position of the first-liquid-medium circuit 14 except the first heat-source flow path 141 as far as the position for detection is fixed. In the present embodiment, a temperature of the first liquid medium flowing through the first liquid medium flow unit 272 of the liquid heater 27 or the heater core 40 is detected as the temperature TH of the first liquid medium used for the determination at step S711. A temperature of the first liquid medium passing through the first cold body 22 is, for example, detected as the first temperature Ts of the cold body 221 used for the determination at step S711.

If it is determined that the temperature TH of the first liquid medium is lower than the first temperature Ts of the cold body 221 at step S711, the electronic control unit 20 proceeds to step S712. On the other hand, if it is determined that the temperature TH of the first liquid medium is equal to or higher than the first temperature Ts of the cold body 221, the electronic control unit 20 proceeds to step S713.

At step S712, the electronic control unit 20 opens the first switching valve 142. In other words, the first switching valve 142 is opened to cause the first liquid medium to flow to the first cold body 22.

At step S713, the electronic control unit 20 closes the first switching valve 142. In other words, the first switching valve 142 is closed to stop the flow of the first liquid medium to the first cold body 22.

After step S712 or S713 in FIG. 11, the electronic control unit 20 returns to step S711 and the control processing in FIG. 11 starts from step S711 again.

Next, the control processing in FIG. 12 will be described. As shown in FIG. 12, the electronic control unit 20 first determines whether a temperature TL of the second liquid medium is lower than a second temperature Ts of the cold body 222 at step S721. The temperature TL of the second liquid medium may be detected at any position of the second-liquid-medium circuit 16 except the second heat-source flow path 161 as far as the position for detection is fixed. In the present embodiment, a temperature of the second liquid medium flowing through the second liquid medium flow unit 352 of the liquid cooler 35 or the outside-air heat absorber 44 is detected as the temperature TL of the second liquid medium used for the determination at step S721. A temperature of the second liquid medium passing through the second cold body 58 is, for example, detected as the second temperature Ts of the cold body 222 used for the determination at step S721.

If it is determined that the temperature TL of the second liquid medium is lower than the second temperature Ts of the cold body 222 at step S721, the electronic control unit 20 proceeds to step S722. On the other hand, if it is determined that the temperature TL of the second liquid medium is equal to or higher than the second temperature Ts of the cold body 222, the electronic control unit 20 proceeds to step S723.

At step S722, the electronic control unit 20 opens the second switching valve 162. In other words, the second switching valve 162 is opened to cause the second liquid medium to flow to the second cold body 58.

At step S723, the electronic control unit 20 closes the second switching valve 162. In other words, the second switching valve 162 is closed to stop the flow of the second liquid medium to the second cold body 58.

After step S722 or S723 in FIG. 12, the electronic control unit 20 returns to step S721 and the control processing in FIG. 12 starts from step S721 again.

In the present embodiment, in the same way as in the above-described first embodiment, it is possible to obtain effects exerted by the same configuration as that in the first embodiment. According to the present embodiment, as shown in FIG. 11, if the temperature TH of the first liquid medium is lower than the first temperature Ts of the cold body 221, the electronic control unit 20 opens the first switching valve 142. Therefore, it is possible to utilize heat of the first cold body 22 for heating without reducing the temperature TH of the first liquid medium heated by the liquid heater 27. In short, by provision and reception of the heat to and from the first cold body 22 and the first liquid medium, it is possible to enhance heating performance.

Moreover, according to the present embodiment, as shown in FIG. 12, if the temperature TL of the second liquid medium is lower than the second temperature Ts of the cold body 222, the electronic control unit 20 opens the second switching valve 162. Therefore, it is possible to utilize heat of the second cold body 58 for heating without reducing the temperature TL of the second liquid medium cooled by the liquid cooler 35. In short, by provision and reception of the heat to and from the second cold body 58 and the second liquid medium, it is possible to enhance the heating performance.

Fifth Embodiment

Next, a fifth embodiment will be described. In the present embodiment, differences from the above-described fourth embodiment will be mainly described.

Figure 13:
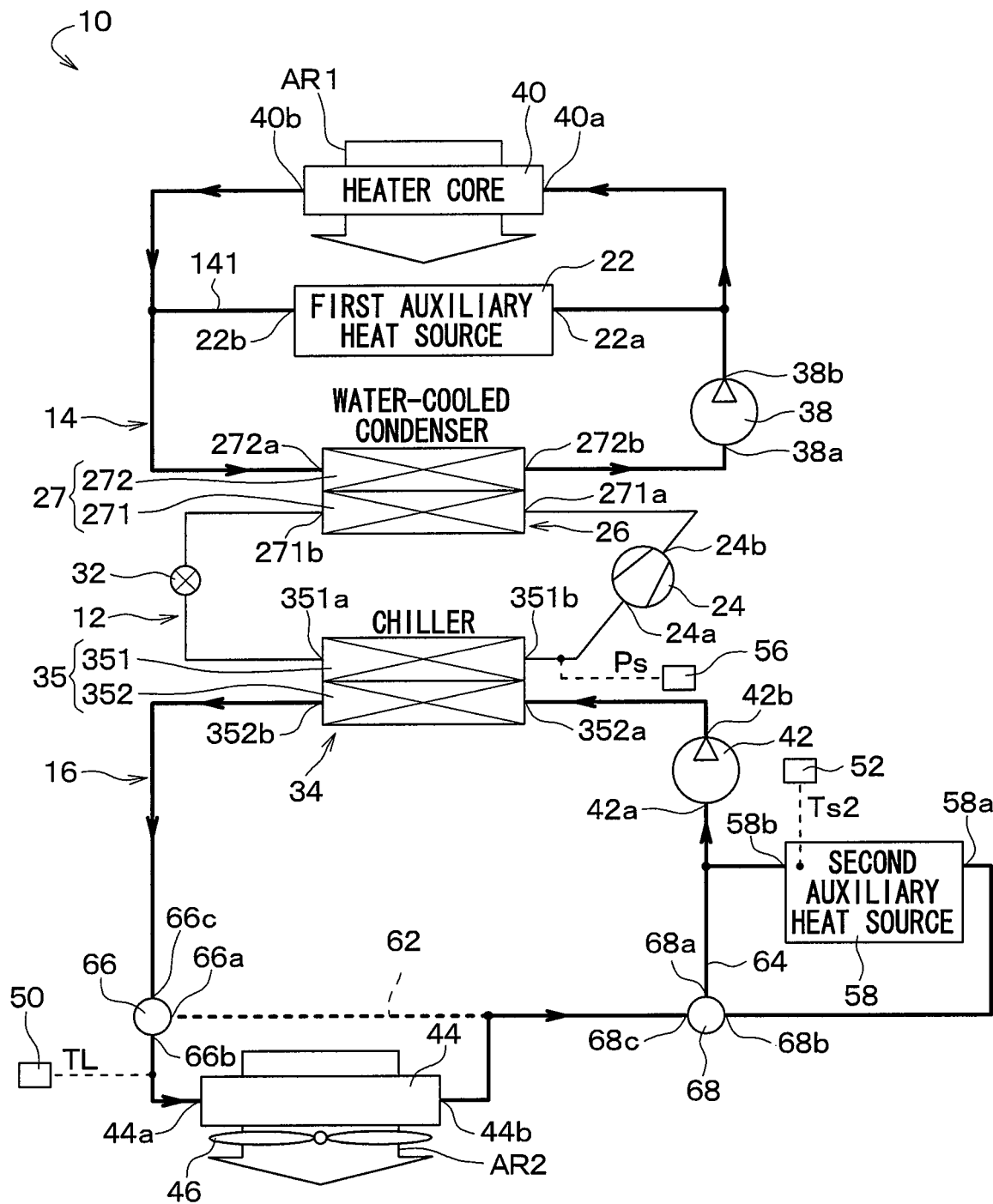
FIG. 13 is a circuit diagram illustrating a whole configuration of an air conditioning system in a fifth embodiment and is a diagram corresponding to FIG. 10 for the fourth embodiment.

FIG. 13 is a circuit diagram illustrating a whole configuration of an air conditioning system 10 in the present embodiment and is a diagram corresponding to FIG. 10 for the fourth embodiment. As shown in FIG. 13, a first switching valve 142, a second heat-source flow path 161, and a second switching valve 162 are not provided in the present embodiment, which is different from the fourth embodiment. Moreover, a second cold body 58 in the present embodiment is disposed differently from that in the fourth embodiment.

Specifically, as shown in FIG. 13, a second-liquid-medium circuit 16 in the present embodiment further includes a heat absorber bypass passage 62, a cold body bypass passage 64, a first switching valve 66, and a second switching valve 68 as compared with the second-liquid-medium circuit 16 in the fourth embodiment.

The heat absorber bypass passage 62 is provided to the second-liquid-medium circuit 16 in parallel to an outside-air heat absorber 44. The cold body bypass passage 64 is provided in parallel to the second cold body 58.

The first switching valve 66 is an electric three-way valve controlled by an electronic control unit 20 and has a first port 66a, a second port 66b, and a third port 66c. The first port 66a is connected to an upstream end of the heat absorber bypass passage 62, the second port 66b is connected to a liquid medium inlet 44a of the outside-air heat absorber 44, and the third port 66c is connected to a liquid medium outlet 352b of a liquid cooler 35. The first switching valve 66 is alternatively switched between a bypass state in which the first port 66a communicates with the third port 66c and the second port 66b is closed and a passable state in which the first port 66a is closed and the second port 66b communicates with the third port 66c.

For example, if the first switching valve 66 comes into the bypass state, second liquid medium flowing into the third port 66c of the first switching valve 66 passes through the heat absorber bypass passage 62. Therefore, the second liquid medium flows while bypassing the outside-air heat absorber 44 and a flow of the second liquid medium to the outside-air heat absorber 44 is interrupted. On the other hand, if the first switching valve 66 comes into the passable state, the second liquid medium does not flow to the heat absorber bypass passage 62 and flows to the outside-air heat absorber 44. In this way, the first switching valve 66 as a flow restricting device restricts the flow of the second liquid medium to the outside-air heat absorber 44 according to the switching state.

The second switching valve 68 is also an electric three-way valve controlled by the electronic control unit 20 similarly to the first switching valve 66. The second switching valve 68 has a first port 68a, a second port 68b, and a third port 68c. The first port 68a is connected to an upstream end of the cold body bypass passage 64, the second port 68b is connected to a liquid medium inlet 58a of the second cold body 58, and the third port 68c is connected to both a downstream end of the heat absorber bypass passage 62 and a liquid medium outlet 44b of the outside-air heat absorber 44. The second switching valve 68 is alternatively switched between a bypass state in which the first port 68a communicates with the third port 68c and the second port 68b is closed and a passable state in which the first port 68a is closed and the second port 68b communicates with the third port 68c. By switching between the bypass state and the passable state, the second switching valve 68 serves as a connection switching device that switches between a connection state in which the second cold body 58 to the second-liquid-medium circuit 16 and a disconnection state in which the second cold body 58 is disconnected from the second-liquid-medium circuit 16.

For example, if the second switching valve 68 is in the bypass state, the second liquid medium flowing into the third port 68c of the second switching valve 68 passes through the cold body bypass passage 64. Therefore, the second liquid medium flows while bypassing the second cold body 58 and a flow of the second liquid medium to the second cold body 58 is interrupted. In other words, the second-liquid-medium circuit 16 is disconnected from the second cold body 58.

On the other hand, if the second switching valve 68 comes into the passable state, the second liquid medium does not flow to the cold body bypass passage 64 and flows to the second cold body 58. In other words, the second cold body 58 is connected to the second-liquid-medium circuit 16.

A suction port 42a of a second water pump 42 is connected to both a downstream end of the cold body bypass passage 64 and a liquid medium outlet 58b of the second cold body 58.

In the present embodiment, in the same way as in the above-described first embodiment, sensors are provided. For example, a liquid medium temperature sensor 50 in the present embodiment detects a temperature TL of the second liquid medium in a liquid medium passage between the second port 66b of the first switching valve 66 and the liquid medium inlet 44a of the outside-air heat absorber 44. A cold body temperature sensor 52 detects a second temperature Ts of the cold body 222 in a second liquid medium flow passage formed in the second cold body 58. A low-pressure-side refrigerant pressure sensor 56 detects a low-pressure-side refrigerant pressure Ps between a refrigerant outlet 351b of the liquid cooler 35 and a suction port 24a of a compressor 24. In the present embodiment, in the same way as in the first embodiment, positions where the respective sensors detect are not limited to the above-described positions.

The electronic control unit 20 (see FIG. 1) in the present embodiment performs various air conditioning controls similarly to that in the first embodiment. As one of the air conditioning controls, the electronic control unit 20 performs a switching valve control for carrying out switching operations of the first switching valve 66 and the second switching valve 68.

Figure 14:
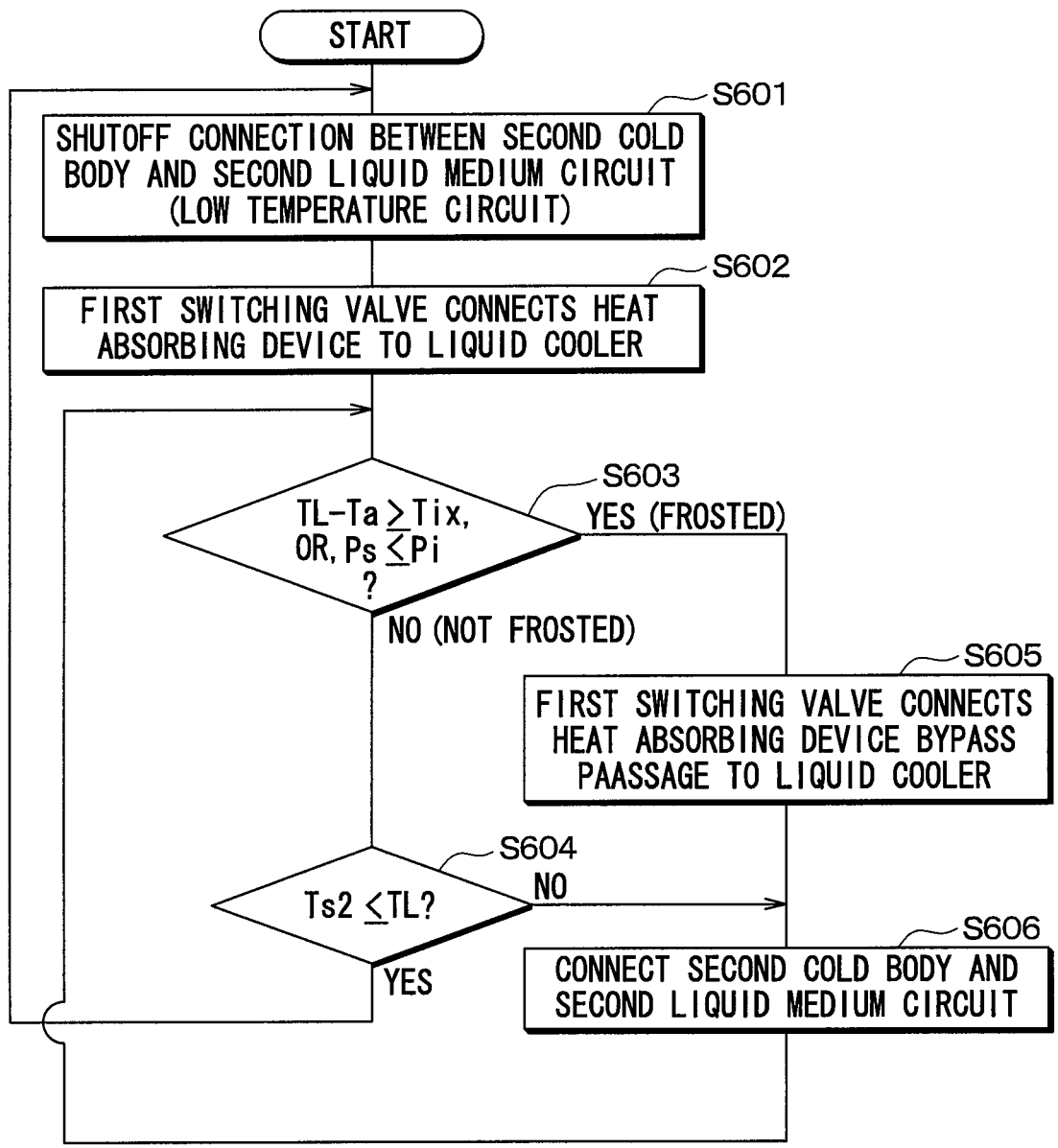
FIG. 14 is a flowchart illustrating control processing performed by an electronic control unit of an air conditioning system in the fifth embodiment.

FIG. 14 is a flowchart illustrating control processing for performing the switching valve control. The electronic control unit 20 starts the control processing in FIG. 14 when an ignition switch of a vehicle is turned on, for example, and performs the control processing in FIG. 14 periodically and repeatedly.

As shown in FIG. 14, the electronic control unit 20 first interrupts the flow of the second liquid medium to the second cold body 58 by use of the second switching valve 68 and causes the second liquid medium to flow to the cold body bypass passage 64 at step S601. Specifically, the electronic control unit 20 switches the second switching valve 68 shown in FIG. 13 into the bypass state. If the second switching valve 68 is already in the bypass state, the second switching valve 68 is maintained in this state. After step S601 in FIG. 14, the electronic control unit 20 proceeds to step S602.

At step S602, the electronic control unit 20 connects the liquid medium outlet 352b of the liquid cooler 35 to the outside-air heat absorber 44 and disconnects the heat absorber bypass passage 62 by use of the first switching valve 66. Specifically, the electronic control unit 20 switches the first switching valve 66 shown in FIG. 13 into the passable state. If the first switching valve 66 is already in the passable state, the first switching valve 66 is maintained in this state. After step S602 in FIG. 14, the electronic control unit 20 proceeds to step S603.

At step S603, it is estimated whether the outside-air heat absorber 44 is frosted. According to the present embodiment, the electronic control unit 20 estimates that the outside-air heat absorber 44 is frosted when an outside-air temperature condition is met. The outside-air temperature condition is met when the temperature TL of the second liquid medium is higher than the temperature Ta of the outside air AR2 and a temperature difference ΔTLa between the temperature TL of the second liquid medium and the temperature Ta of the outside air AT2 is a threshold value Tix of the temperature difference ΔTLa or greater. That is, when the outside-air temperature condition is met, an expression TL−Ta≥Tix is satisfied. Alternatively, the electronic control unit 20 estimates that the outside-air heat absorber 44 is frosted when the low-pressure-side refrigerant pressure Ps is a threshold value Pi of the low-pressure-side refrigerant pressure Ps or lower. The threshold value Tix of the temperature difference ΔTLa is determined experimentally in advance for determining whether the outside-air heat absorber 44 is frosted. For example, the threshold value Tix of the temperature difference ΔTLa is 0 or higher.

At step S603, it is estimated whether the outside-air heat absorber 44 is frosted by obtaining the temperature TL of the second liquid medium, the temperature Ta of the outside air AR2, and the low-pressure-side refrigerant pressure Ps.

The electronic control unit 20 advances to step S605 when the outside-air heat absorber 44 is estimated to be frosted at step S603. On the other hand, the electronic control unit 20 advances to step S604 when the outside-air heat absorber 44 is estimated not to be frosted at step S603.

At step S604, the second temperature Ts of the cold body 222 is obtained and it is determined whether the second temperature Ts of the cold body 222 is not higher than the temperature TL of the second liquid medium.

If it is determined that the second temperature Ts of the cold body 222 is not higher than the temperature TL of the second liquid medium at step S604, the electronic control unit 20 proceeds to step S601. On the other hand, if it is determined that the second temperature Ts of the cold body 222 is higher than the temperature TL of the second liquid medium, the electronic control unit 20 proceeds to step S606.

At step S605, the electronic control unit 20 causes the second liquid medium to flow into the heat absorber bypass passage 62 and interrupts the flow of the second liquid medium to the outside-air heat absorber 44 by use of the first switching valve 66. As a result, the second liquid medium circulating through the second-liquid-medium circuit 16 does not absorb heat from the outside air AR2. Here, it is unnecessary to completely interrupt the flow of the second liquid medium to the outside-air heat absorber 44. It is essential only that a flow rate of the second liquid medium flowing to the outside-air heat absorber 44 be reduced as compared with the flow of the second liquid medium achieved at step S602, for example.

To put it concrete, the first switching valve 66 shown in FIG. 13 is switched into the bypass state. If the first switching valve 66 is already in the bypass state, the first switching valve 66 is maintained in this state. After step S605 in FIG. 14, the electronic control unit 20 proceeds to step S606.

At step S606, the electronic control unit 20 causes the second liquid medium to flow into the second cold body 58 and disconnects the cold body bypass passage 64 by use of the second switching valve 68. Specifically, the electronic control unit 20 switches the second switching valve 68 shown in FIG. 13 into the passable state. If the second switching valve 68 is already in the passable state, the second switching valve 68 is maintained in this state. As a result, it is possible to perform heat absorption from the second cold body 58 to perform heat pump heating operation. After step S606 in FIG. 14, the electronic control unit 20 proceeds to step S603.

By performing the control processing in FIG. 14 in this manner, the electronic control unit 20 reduces the flow rate of the second liquid medium flowing into the outside-air heat absorber 44 by use of the first switching valve 66 when the outside air condition that the temperature TL of the second liquid medium is higher than the temperature Ta of the outside air AR2 and that the temperature difference ΔTLa between the temperature TL of the second liquid medium and the temperature Ta is equal to or greater than the threshold value Tix of the temperature difference ΔTLa is satisfied as compared with the flow rate when the outside-air temperature condition is not satisfied. In this way, it is possible to suppress heat dissipation from the second liquid medium to the outside air AR2 (see FIG. 13) in the outside-air heat absorber 44. As a result, the frost formation can be prevented from advancing when the outside-air heat absorber 44 is frosted.

The electronic control unit 20 interrupts a flow of the second liquid medium to the second cold body 58 by operating the second switching valve 68 when a temperature Ts2 of the second cold body 58 is lower than or equal to the temperature TL of the second liquid medium. Thus, it is possible to suppress heat dissipation from the second liquid medium to the second cold body 58.

Steps S602 and S605 in FIG. 14 correspond to a control section.

In the present embodiment, in the same way as in the above-described fourth embodiment, it is possible to obtain effects exerted by the same configuration as that in the fourth embodiment.

Sixth Embodiment

Next, a sixth embodiment will be described. In the present embodiment, differences from the above-described first embodiment will be mainly described.

The present embodiment is different from the first embodiment only in control processing performed by an electronic control unit 20. Therefore, a circuit configuration of an air conditioning system 10 in the present embodiment is the same as that in the first embodiment and is shown in FIG. 1.

Figure 15:
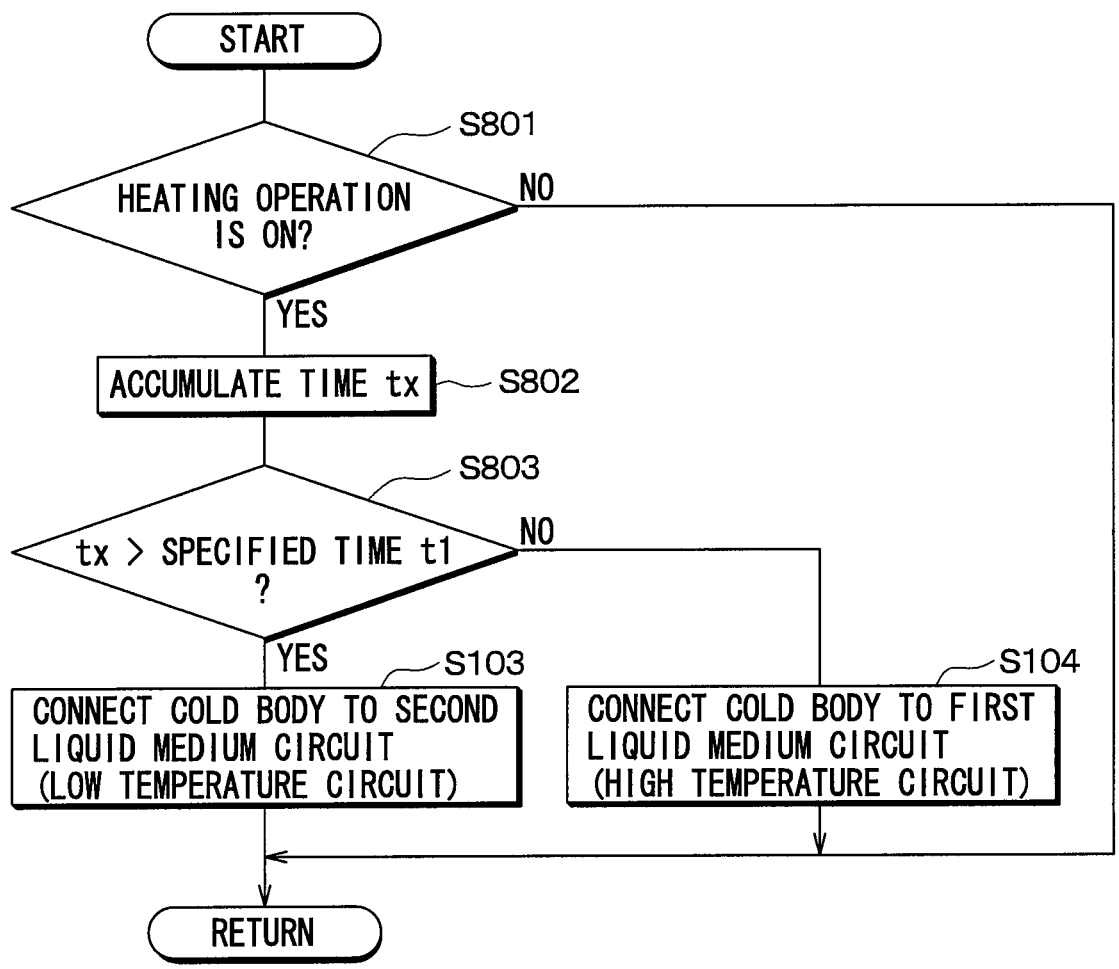
FIG. 15 is a flowchart illustrating control processing performed by an electronic control unit in a sixth embodiment and is a chart corresponding to FIG. 2 for the first embodiment.

Specifically, the electronic control unit 20 in the present embodiment performs the control processing in FIG. 15 periodically and repeatedly. FIG. 15 is a flowchart illustrating control processing performed by the electronic control unit 20 in the present embodiment and is a chart corresponding to FIG. 2 for the first embodiment.

As shown in FIG. 15, the electronic control unit 20 first determines whether heating by the air conditioning system 10 is in an ON state at step S801. For example, the determination is made based on an operated position of a heating switch operated by an occupant. If the heating switch is turned on, the heating by the air conditioning system 10 is performed. In other words, the heating is turned on. On the other hand, if the heating switch is turned off, the heating by the air conditioning system 10 stops. In other words, the heating is turned off. Therefore, if the heating switch is in an ON state, it is determined that the heating is in the ON state. On the other hand, if the heating switch is in an OFF state, it is determined that the heating is in an OFF state.

If it is determined that the heating is in the ON state at step S801, the electronic control unit 20 proceeds to step S802. On the other hand, if it is determined that the heating is in the OFF state, the flowchart in FIG. 15 starts from step S801 again.

At step S802, a cumulative time tx is accumulated. If accumulation of the cumulative time tx has already been started, the accumulation of the cumulative time tx is continued.

An initial value of the cumulative time tx is 0 and the cumulative time tx returns to the initial value every time the heating by the air conditioning system 10 is turned off, for example. Therefore, the cumulative time tx represents an elapsed time that elapses from a time where the heating operation of the air conditioning system 10 starts. After step S802, the electronic control unit 20 proceeds to step S803.

At step S803, whether the cumulative time tx is longer than a specified time t1 is determined. The specified time t1 is determined experimentally in advance so that both improvement of starting performance of the heating by the air conditioning system 10 and prevention of frost formation on an outside-air heat absorber 44 are obtained.

If it is determined that the cumulative time tx is longer than the specified time t1 at step S803, the electronic control unit 20 proceeds to step S103. On the other hand, if it is determined that the cumulative time tx is not longer than the specified time t1, the electronic control unit 20 proceeds to step S104.

Step S103 in FIG. 15 is the same as step S103 in FIG. 2 and step S104 in FIG. 15 is the same as step S104 in FIG. 2.

According to the control processing in FIG. 15, the electronic control unit 20 controls the circuit switching device 19 to set the connection state in which the cold body 22 is connected to the first-liquid-medium circuit 14 until the specified time t1 elapses from a time where the heating operation starts. Then, after a lapse of the specified time t1, the electronic control unit 20 causes the circuit switching device 19 to connect the cold body 22 to the second-liquid-medium circuit 16.

Therefore, by provision and reception of heat to and from the cold body 22 and the first or second liquid medium, it is possible to enhance heating performance. Moreover, it is possible to accelerate increase in a temperature of the first liquid medium which has a large impact on heating of the conditioned air AR1 at the start of the heating operation. In addition, it is possible to give priority to suppressing a deterioration of the performance of the heating operation due to a frost of the outside-air heat absorber 44 after the specified time t1 elapses from the time where the heating operation starts.

In the present embodiment, in the same way as in the above-described first embodiment, it is possible to obtain effects exerted by the same configuration as that in the first embodiment.

Although the control processing in FIG. 15 is performed as described above in the present embodiment, the control processing in FIG. 2 may be performed as well as the control processing in FIG. 15 as a variation of the present embodiment. For example, the control processing in FIG. 2 is performed in place of the control processing in FIG. 15 after a specified time elapses from a time where the cold body 22 is connected to the second-liquid-medium circuit 16 at step S103 shown in FIG. 15.

Seventh Embodiment

Next, a seventh embodiment will be described. In the present embodiment, differences from the above-described first embodiment will be mainly described.

The present embodiment is different from the first embodiment only in control processing performed by an electronic control unit 20. Therefore, a circuit configuration of an air conditioning system 10 in the present embodiment is the same as that in the first embodiment and is shown in FIG. 1.

Figure 16:
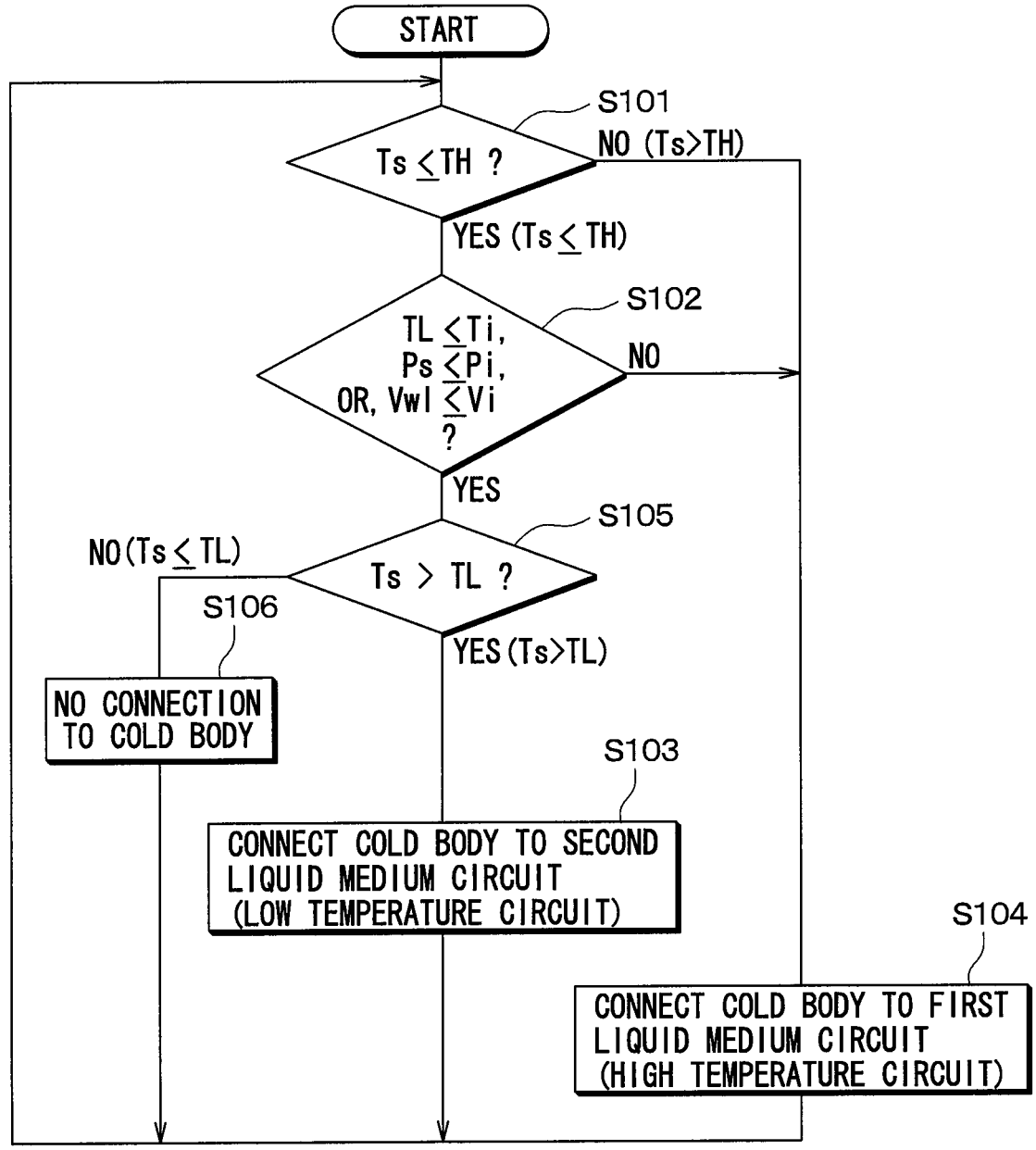
FIG. 16 is a flowchart illustrating control processing performed by an electronic control unit in a seventh embodiment and is a chart corresponding to FIG. 2 for the first embodiment.

Specifically, the electronic control unit 20 in the present embodiment performs the control processing in FIG. 16 periodically and repeatedly. FIG. 16 is a flowchart illustrating the control processing performed by the electronic control unit 20 in the present embodiment and is a chart corresponding to FIG. 2 for the first embodiment.

The flowchart in FIG. 16 includes the same steps S101, S102, S103, and S104 as those in FIG. 2. In addition to those steps, the flowchart includes steps S105 and S106. Therefore, steps S101, S102, S103, and S104 will not be described and steps S105 and S106 will be described below.

In the flowchart of FIG. 16, the electronic control unit 20 advances to step S105 when the outside-air heat absorber 44 is estimated to be frosted at step S102. As can be seen from an order in which steps S101 and S105 are performed, step S105 is performed when it is determined that a temperature Ts of the cold body 22 is equal to or lower than a temperature TH of the first liquid medium at step S101.

As shown in FIG. 16, the electronic control unit 20 determines whether the temperature Ts of the cold body 22 is higher than a temperature TL of the second liquid medium at step S105.

If it is determined that the temperature Ts of the cold body 22 is higher than the temperature TL of the second liquid medium at step S105, the electronic control unit 20 proceeds to step S103. On the other hand, if it is determined that the temperature Ts of the cold body 22 is equal to or lower than the temperature TL of the second liquid medium, the electronic control unit 20 proceeds to step S106.

At step S106, the electronic control unit 20 connects a cold body 22 shown in FIG. 1 to neither of a first-liquid-medium circuit 14 and a second-liquid-medium circuit 16. In other words, in the first-liquid-medium circuit 14, first liquid medium circulates without flowing through the cold body 22. At the same time, in the second-liquid-medium circuit 16, second liquid medium circulates without flowing through the cold body 22.

Specifically, the electronic control unit 20 switches a first three-way valve 193 and a second three-way valve 194 into disconnected states. At the same time, the electronic control unit 20 opens a first switching valve 191 and a second switching valve 192. The disconnected state of the first three-way valve 193 and the disconnected state of the second three-way valve 194 in the present embodiment are the same as those of the three-way valves 193 to 196 described in the third embodiment.

After steps S103, S104, or S106, the electronic control unit 20 returns to step S101, the control processing in FIG. 16 starts from step S101 again.

According to the control processing in FIG. 16, the electronic control unit 20 in the present embodiment connects the cold body 22 to the first-liquid-medium circuit 14 by use of the circuit switching device 19 when the temperature Ts of the cold body 22 is higher than the temperature TH of the first liquid medium. In this way, it is possible to prevent the cold body 22 from absorbing heat from the first liquid medium when the cold body 22 is connected to the first-liquid-medium circuit 14.

The electronic control unit 20 in the present embodiment causes the circuit switching device 19 to connect the cold body 22 to the second-liquid-medium circuit 16 when the temperature Ts of the cold body 22 is equal to or lower than the temperature TH of the first liquid medium and the temperature Ts of the cold body 22 is higher than the temperature TL of the second liquid medium. In this way, it is possible to prevent the cold body 22 from absorbing heat from the second liquid medium when the cold body 22 is connected to the second-liquid-medium circuit 16.

In the present embodiment, in the same way as in the above-described first embodiment, it is possible to obtain effects exerted by the same configuration as that in the first embodiment.

Eighth Embodiment

Next, an eighth embodiment will be described. In the present embodiment, differences from the above-described second embodiment will be mainly described.

Figure 17:
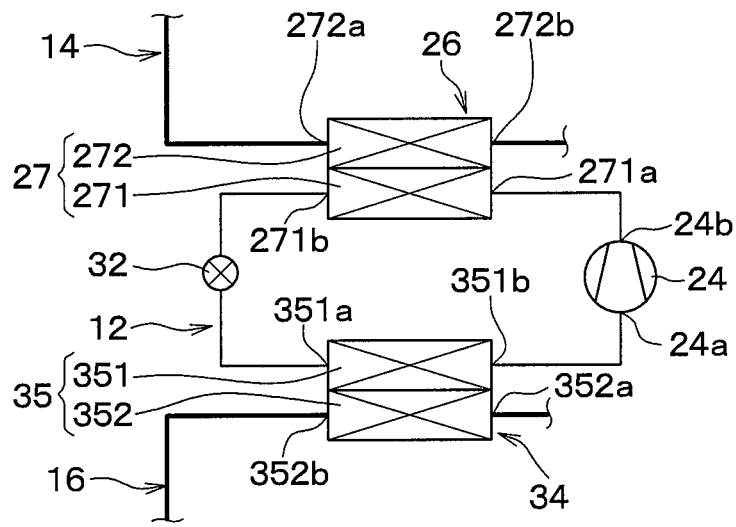
FIG. 17 is a circuit diagram illustrating a configuration of a heat pump provided to an air conditioning system in an eighth embodiment.

The present embodiment is different from the second embodiment in a heat pump 12 and is the same as the second embodiment except the heat pump 12. In other words, an air conditioning system 10 in the present embodiment is configured by replacing the heat pump 12 in the air conditioning system 10 in the second embodiment with the heat pump 12 in FIG. 17. The heat pump 12 in the present embodiment shown in FIG. 17 is the same as the heat pump 12 in the first embodiment shown in FIG. 1.

In the present embodiment, in the same way as in the above-described second embodiment, it is possible to obtain effects exerted by the same configuration as that in the second embodiment.

Ninth Embodiment

Next, a ninth embodiment will be described. In the present embodiment, differences from the above-described first embodiment will be mainly described.

The present embodiment is different from the first embodiment in a heat pump 12 and is the same as the first embodiment except the heat pump 12. In other words, an air conditioning system 10 in the present embodiment is configured by replacing the heat pump 12 in the air conditioning system 10 in the first embodiment with the heat pump 12 in FIG. 18. The heat pump 12 in the present embodiment shown in FIG. 18 is the same as the heat pump 12 in the third embodiment shown in FIG. 7.

In the present embodiment, in the same way as in the above-described first embodiment, it is possible to obtain effects exerted by the same configuration as that in the first embodiment.

Figure 18:
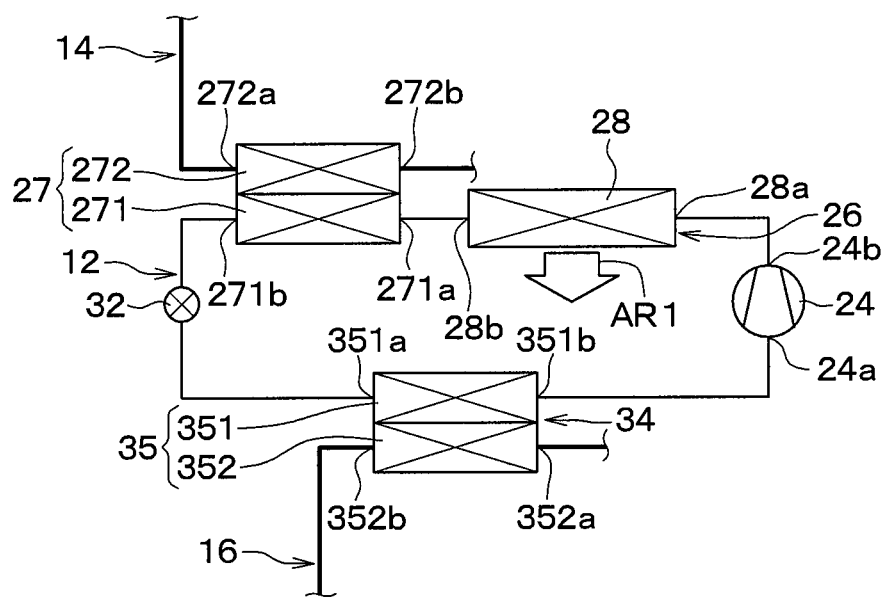
FIG. 18 is a circuit diagram illustrating a configuration of a heat pump provided to an air conditioning system in a ninth embodiment.

Although the heat pump 12 in the first embodiment is replaced with the heat pump 12 in FIG. 18 in the present embodiment, each of the heat pumps 12 in the above-described second and fourth to seventh embodiments may be replaced with the heat pump 12 in FIG. 18.

Tenth Embodiment

Next, a tenth embodiment will be described. In the present embodiment, differences from the above-described first embodiment will be mainly described.

The present embodiment is different from the first embodiment in a heat pump 12 and is the same as the first embodiment except the heat pump 12. In other words, an air conditioning system 10 in the present embodiment is configured by replacing the heat pump 12 in the air conditioning system 10 in the first embodiment with the heat pump 12 in FIG. 19. The heat pump 12 of the present embodiment shown in FIG. 19 is different from the above-described heat pump 12 shown in FIG. 18 in a connection state between the liquid heater 27 and the condenser 28.

Figure 19:
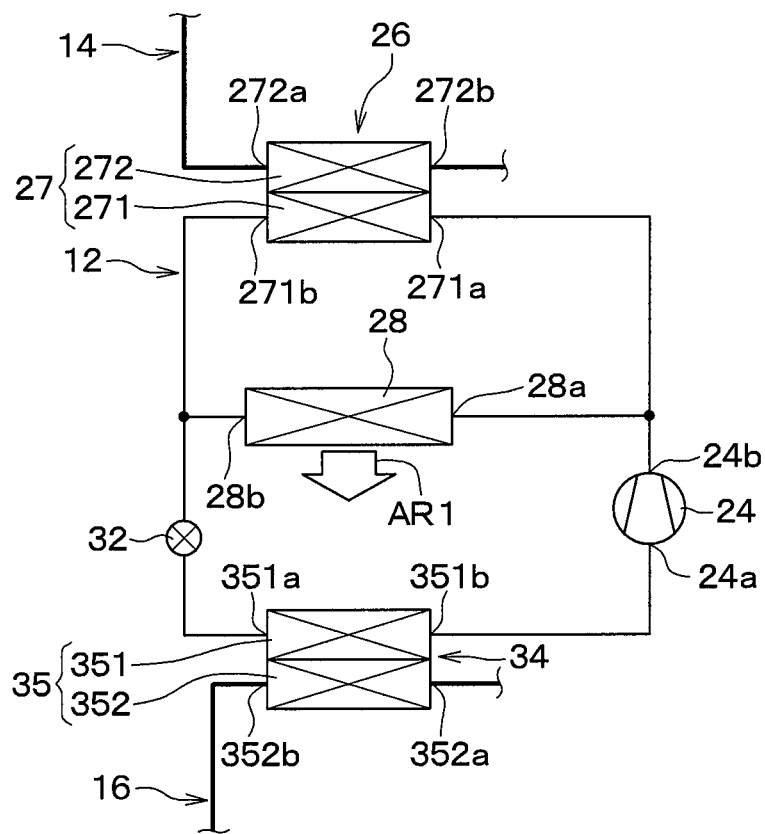
FIG. 19 is a circuit diagram illustrating a configuration of a heat pump provided to an air conditioning system in a tenth embodiment.

Specifically, as shown in FIG. 19, a refrigerant radiator 26 in the present embodiment includes the condenser 28 in addition to the liquid heater 27. The condenser 28 is connected in parallel to a refrigerant flow unit 271 of the liquid heater 27. Therefore, the refrigerant discharged from a discharge port 24b of a compressor 24 flows into the refrigerant flow unit 271 of the liquid heater 27 and the condenser 28. The refrigerant from the refrigerant flow unit 271 of the liquid heater 27 and the condenser 28 flows into a pressure reducer 32.

In the present embodiment, in the same way as in the above-described first embodiment, it is possible to obtain effects exerted by the same configuration as that in the first embodiment.

Although the heat pump 12 in the first embodiment is replaced with the heat pump 12 in FIG. 19 in the present embodiment, each of the heat pumps 12 in the above-described second to seventh embodiments may be replaced with the heat pump 12 in FIG. 19.

Eleventh Embodiment

Next, an eleventh embodiment will be described. In the present embodiment, differences from the above-described first embodiment will be mainly described.

The present embodiment is different from the first embodiment in a heat pump 12 and is the same as the first embodiment except the heat pump 12. In other words, an air conditioning system 10 in the present embodiment is configured by replacing the heat pump 12 in the air conditioning system 10 in the first embodiment with the heat pump 12 in FIG. 20. The heat pump 12 in the present embodiment shown in FIG. 20 is configured by adding an exterior radiator 72 to the heat pump 12 in FIG. 1.

Figure 20:
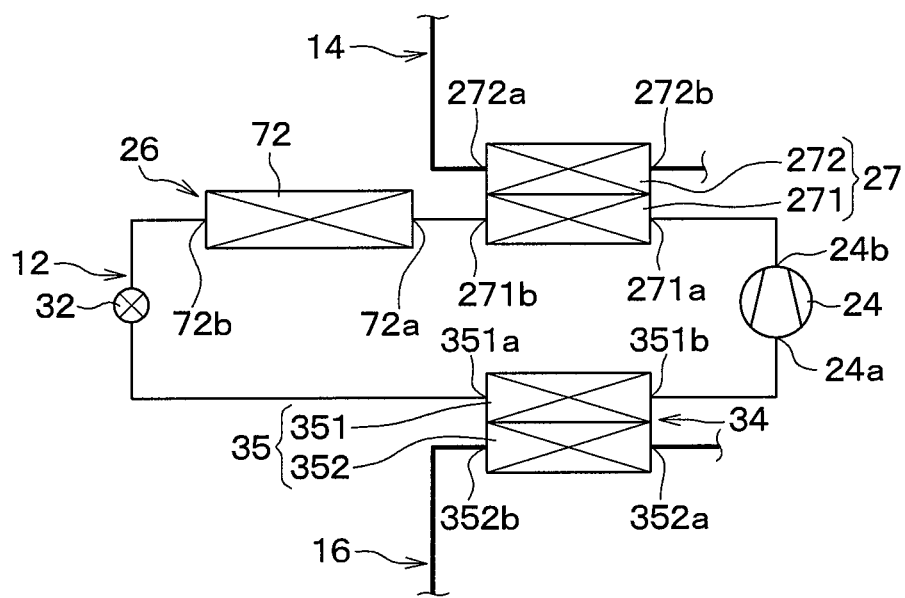
FIG. 20 is a circuit diagram illustrating a configuration of a heat pump provided to an air conditioning system in an eleventh embodiment.

Specifically, as shown in FIG. 20, a refrigerant radiator 26 in the present embodiment includes the exterior radiator 72 in addition to a liquid heater 27.

The exterior radiator 72 has a refrigerant inlet 72a and a refrigerant outlet 72b. The exterior radiator 72 transfers heat of the refrigerant, which flows into the exterior radiator 72 from the refrigerant inlet 72a, to the outside air AR2, which passes through the exterior radiator 72, by performing a heat exchange between the refrigerant and the outside air AR2. In other words, the heat is dissipated from the refrigerant to the outside air AR2.

The exterior radiator 72 is connected in series to a refrigerant flow unit 271 of a liquid heater 27. Specifically, the exterior radiator 72 is provided on a downstream side of the refrigerant flow unit 271 in a refrigerant flow direction.

Therefore, the refrigerant flowing out of a refrigerant outlet 271b of the liquid heater 27 flows into the refrigerant inlet 72a of the exterior radiator 72. Then, after the heat exchange of the refrigerant in the exterior radiator 72, the refrigerant flows from the refrigerant outlet 72b of the exterior radiator 72 to a pressure reducer 32.

In the present embodiment, in the same way as in the above-described first embodiment, it is possible to obtain effects exerted by the same configuration as that in the first embodiment.

Although the heat pump 12 in the first embodiment is replaced with the heat pump 12 in FIG. 20 in the present embodiment, each of the heat pumps 12 in the above-described second and fourth to seventh embodiments may be replaced with the heat pump 12 in FIG. 20.

Twelfth Embodiment

Next, a twelfth embodiment will be described. In the present embodiment, differences from the above-described first embodiment will be mainly described.

The present embodiment is different from the first embodiment in a heat pump 12 and is the same as the first embodiment except the heat pump 12. In other words, an air conditioning system 10 in the present embodiment is configured by replacing the heat pump 12 in the air conditioning system 10 in the first embodiment with the heat pump 12 in FIG. 21. The heat pump 12 of the present embodiment shown in FIG. 21 is different from the above-described heat pump 12 shown in FIG. 20 in a connection state between the liquid heater 27 and the exterior radiator 72.

Figure 21:
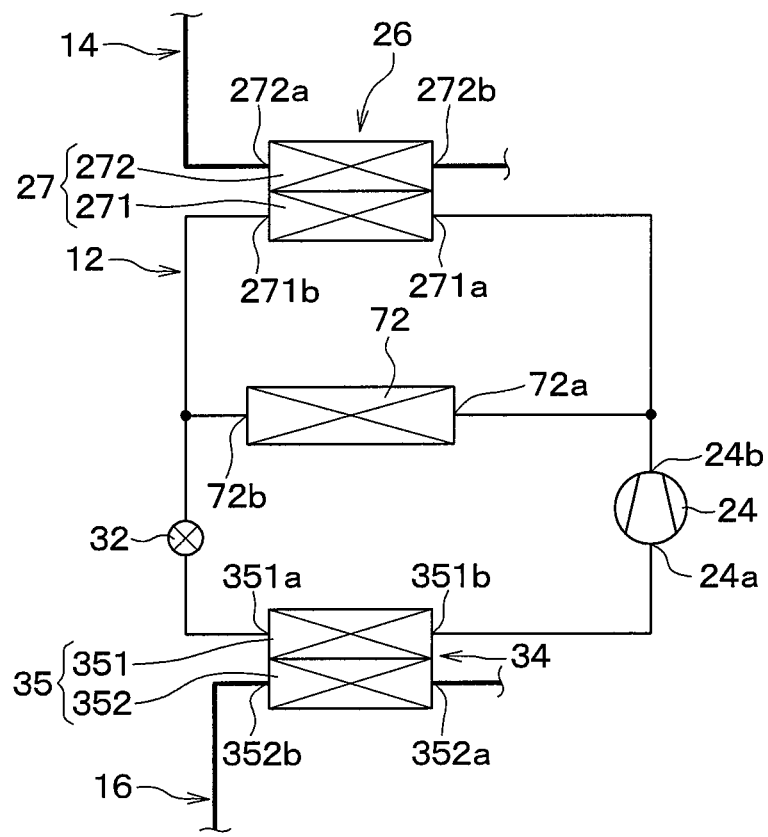
FIG. 21 is a circuit diagram illustrating a configuration of a heat pump provided to an air conditioning system in a twelfth embodiment.

Specifically, as shown in FIG. 21, a refrigerant radiator 26 in the present embodiment includes the exterior radiator 72 in addition to the liquid heater 27. The exterior radiator 72 is connected in parallel to a refrigerant flow unit 271 of the liquid heater 27. Therefore, refrigerant discharged from a discharge port 24b of a compressor 24 flows into the refrigerant flow unit 271 of the liquid heater 27 and the exterior radiator 72. The refrigerant from the refrigerant flow unit 271 of the liquid heater 27 and the exterior radiator 72 flows into a pressure reducer 32.

In the present embodiment, in the same way as in the above-described first embodiment, it is possible to obtain effects exerted by the same configuration as that in the first embodiment.

Although the heat pump 12 in the first embodiment is replaced with the heat pump 12 in FIG. 21 in the present embodiment, each of the heat pumps 12 in the above-described second and fourth to seventh embodiments may be replaced with the heat pump 12 in FIG. 21.

Thirteenth Embodiment

Next, a thirteenth embodiment will be described. In the present embodiment, differences from the above-described first embodiment will be mainly described.

The present embodiment is different from the first embodiment in a heat pump 12 and is the same as the first embodiment except the heat pump 12. In other words, an air conditioning system 10 in the present embodiment is configured by replacing the heat pump 12 in the air conditioning system 10 in the first embodiment with the heat pump 12 in FIG. 22. The heat pump 12 in the present embodiment shown in FIG. 22 is the same as the heat pump 12 in the second embodiment shown in FIG. 4.

In the present embodiment, in the same way as in the above-described first embodiment, it is possible to obtain effects exerted by the same configuration as that in the first embodiment.

Figure 22:
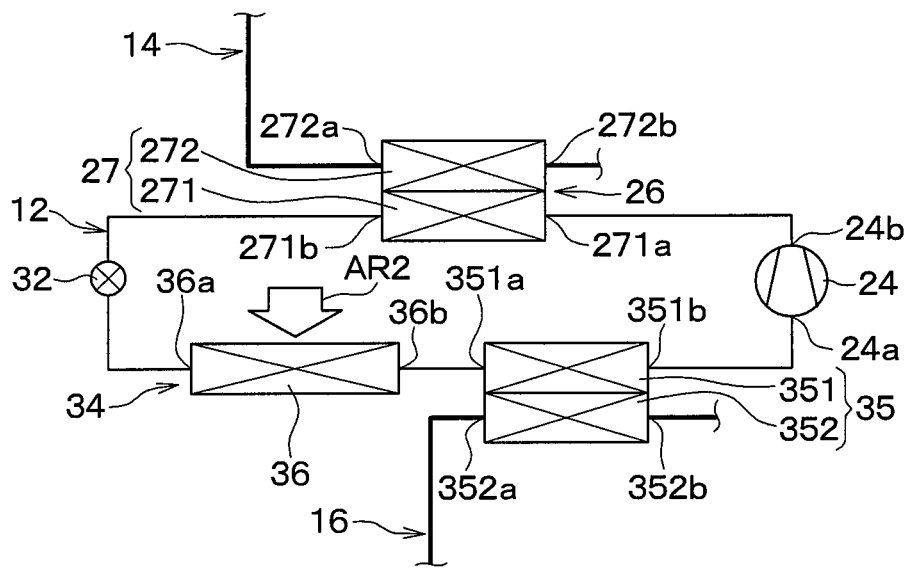
FIG. 22 is a circuit diagram illustrating a configuration of a heat pump provided to an air conditioning system in a thirteenth embodiment.

Although the heat pump 12 in the first embodiment is replaced with the heat pump 12 in FIG. 22 in the present embodiment, each of the heat pumps 12 in the above-described fourth to seventh embodiments may be replaced with the heat pump 12 in FIG. 22.

Fourteenth Embodiment

Next, a fourteenth embodiment will be described. In the present embodiment, differences from the above-described first embodiment will be mainly described.

The present embodiment is the same as the first embodiment except the heat pump 12. In other words, an air conditioning system 10 in the present embodiment is configured by replacing the heat pump 12 in the air conditioning system 10 in the first embodiment with the heat pump 12 in FIG. 23. The heat pump 12 of the present embodiment shown in FIG. 23 is different from the above-described heat pump 12 shown in FIG. 22 in a connection state between the liquid cooler 35 and the refrigerant evaporator 36.

Figure 23:
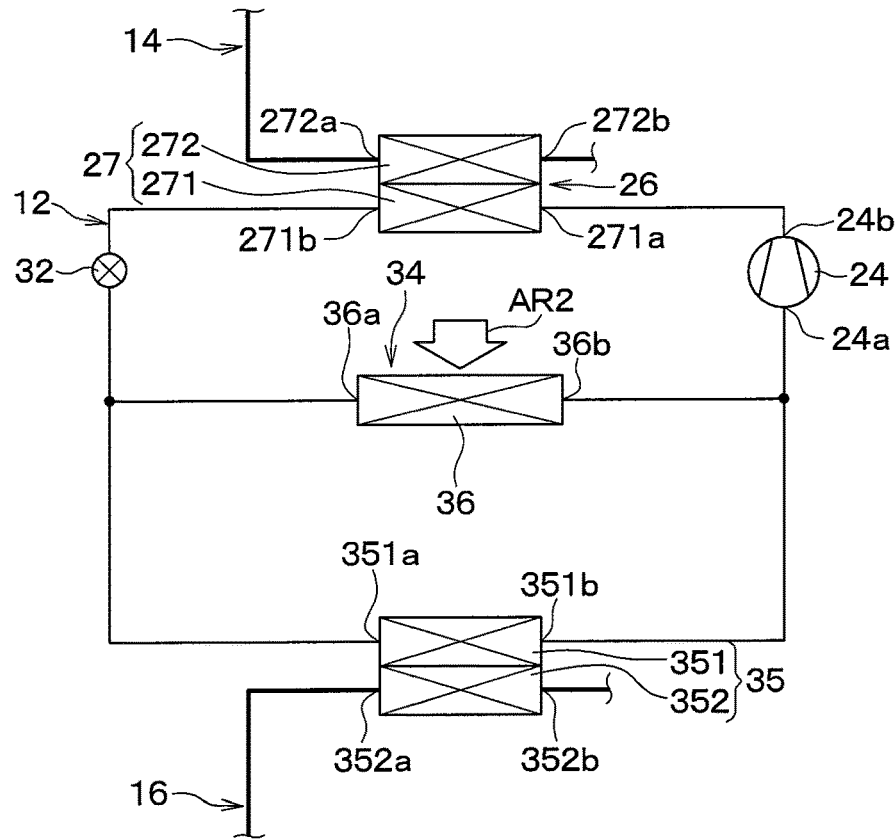
FIG. 23 is a circuit diagram illustrating a configuration of a heat pump provided to an air conditioning system in a fourteenth embodiment.

Specifically, as shown in FIG. 23, a refrigerant heat absorber 34 in the present embodiment includes the refrigerant evaporator 36 in addition to the liquid cooler 35. The refrigerant evaporator 36 is connected in parallel to a refrigerant flow unit 351 of the liquid cooler 35. Therefore, refrigerant discharged from a pressure reducer 32 flows into the refrigerant flow unit 351 of the liquid cooler 35 and the refrigerant evaporator 36. The refrigerant, which flows out of the refrigerant flow unit 351 of the liquid cooler 35, and the refrigerant, which flows out of the refrigerant evaporator 36, flow into a suction port 24a of the compressor 24.

In the present embodiment, in the same way as in the above-described first embodiment, it is possible to obtain effects exerted by the same configuration as that in the first embodiment.

Although the heat pump 12 in the first embodiment is replaced with the heat pump 12 in FIG. 23 in the present embodiment, each of the heat pumps 12 in the above-described second and fourth to seventh embodiments may be replaced with the heat pump 12 in FIG. 23.

Fifteenth Embodiment

Next, a fifteenth embodiment will be described. In the present embodiment, differences from the above-described first embodiment will be mainly described.

Figure 24:
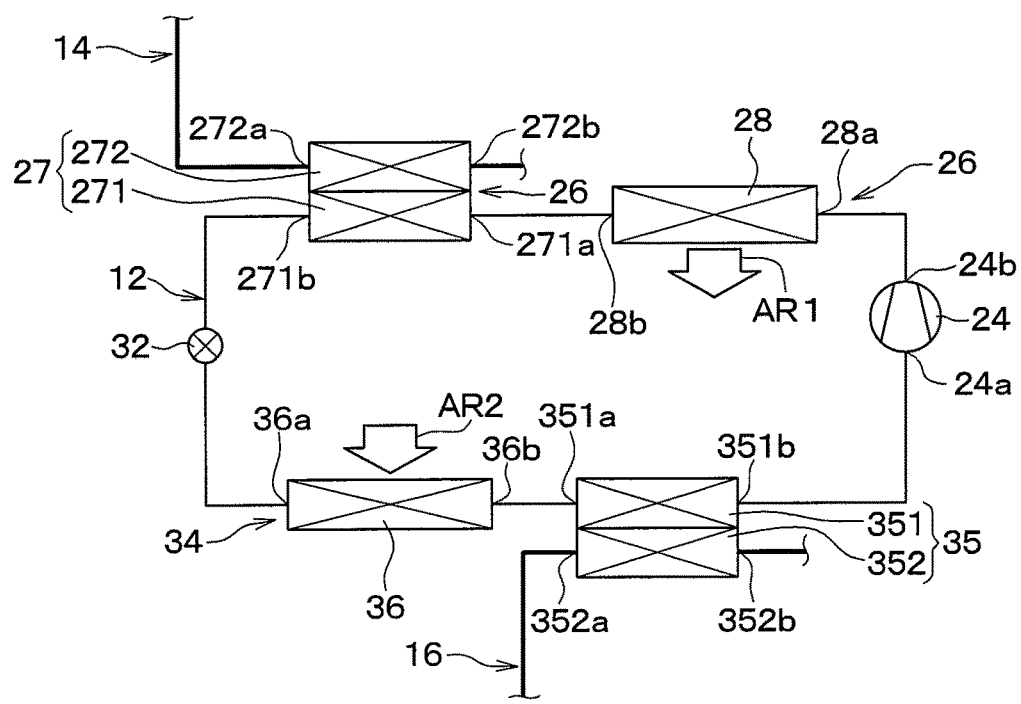
FIG. 24 is a circuit diagram illustrating a configuration of a heat pump provided to an air conditioning system in a fifteenth embodiment.

The present embodiment is the same as the first embodiment except the heat pump 12. In other words, an air conditioning system 10 in the present embodiment is configured by replacing the heat pump 12 in the air conditioning system 10 in the first embodiment with the heat pump 12 in FIG. 24. A refrigerant radiator 26 in the present embodiment shown in FIG. 24 is the same as the refrigerant radiator 26 in the ninth embodiment shown in FIG. 18. A refrigerant heat absorber 34 in the present embodiment is the same as the refrigerant heat absorber 34 in the thirteenth embodiment shown in FIG. 22.

In the present embodiment, in the same way as in the above-described first embodiment, it is possible to obtain effects exerted by the same configuration as that in the first embodiment.

Although the heat pump 12 in the first embodiment is replaced with the heat pump 12 in FIG. 24 in the present embodiment, each of the heat pumps 12 in the above-described second to seventh embodiments may be replaced with the heat pump 12 in FIG. 24.

Sixteenth Embodiment

Next, a sixteenth embodiment will be described. In the present embodiment, differences from the above-described first embodiment will be mainly described.

Figure 25:
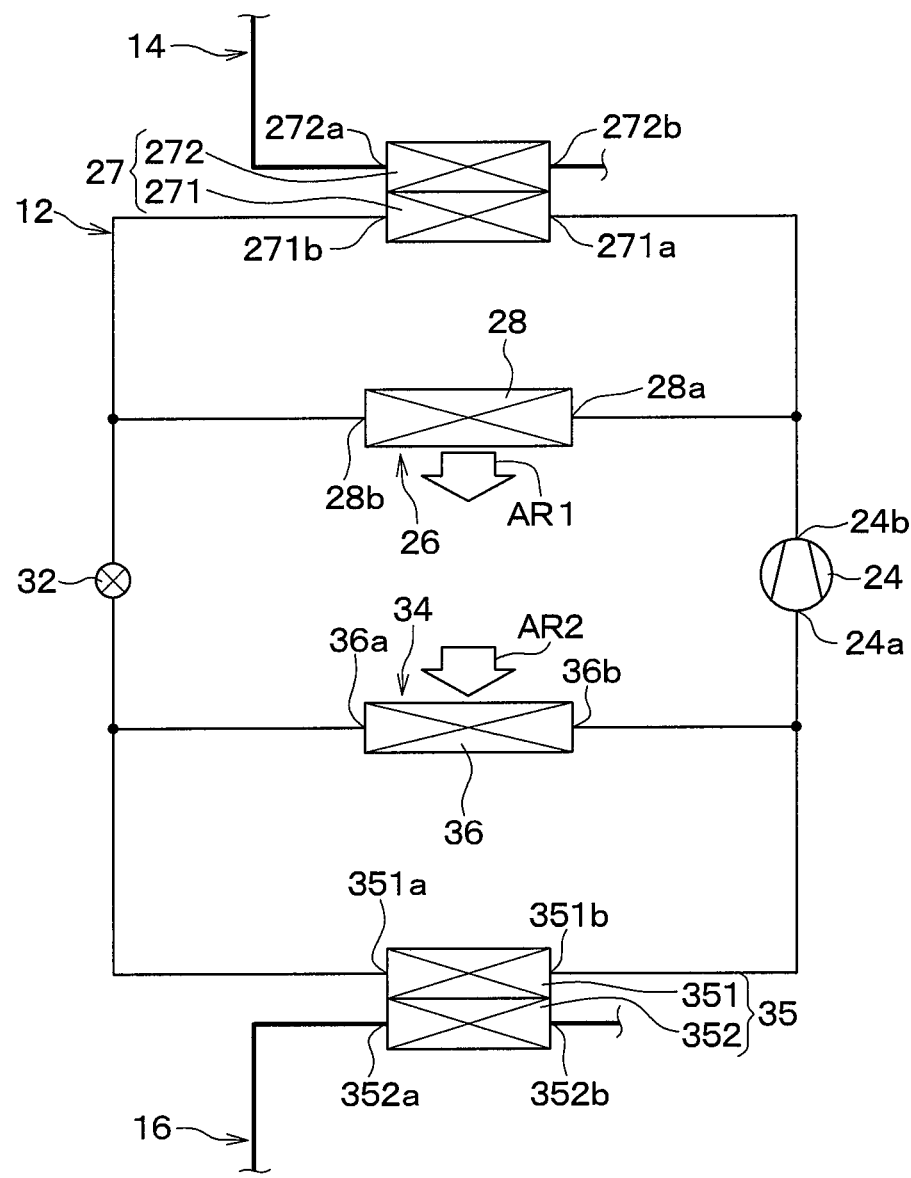
FIG. 25 is a circuit diagram illustrating a configuration of a heat pump provided to an air conditioning system in a sixteenth embodiment.
Figure 26:
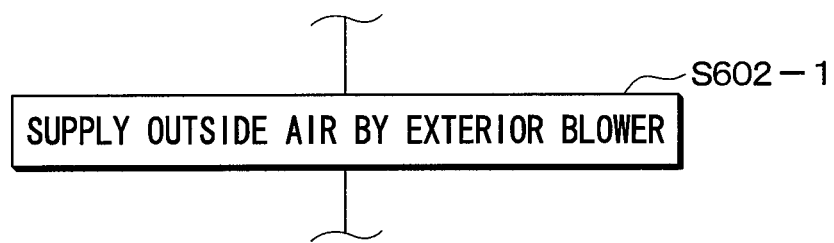
FIG. 26 is a first chart illustrating a variation of the fifth embodiment and illustrating step S602-1 which is a replacement for step S602 in FIG. 14.
Figure 27:
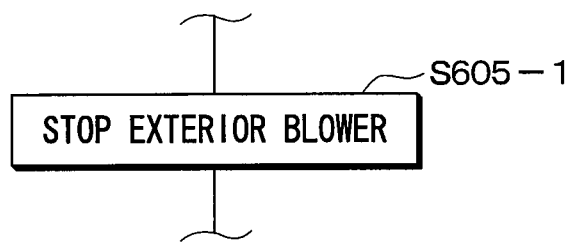
FIG. 27 is a second chart illustrating a variation of the fifth embodiment and illustrating step S605-1 which is a replacement for step S605 in FIG. 14.

The present embodiment is the same as the first embodiment except the heat pump 12. In other words, an air conditioning system 10 in the present embodiment is configured by replacing the heat pump 12 in the air conditioning system 10 in the first embodiment with the heat pump 12 in FIG. 25. A refrigerant radiator 26 in the present embodiment shown in FIG. 25 is the same as the refrigerant radiator 26 in the tenth embodiment shown in FIG. 19. A refrigerant heat absorber 34 in the present embodiment is the same as the refrigerant heat absorber 34 in the fourteenth embodiment shown in FIG. 23.

In the present embodiment, in the same way as in the above-described first embodiment, it is possible to obtain effects exerted by the same configuration as that in the first embodiment.

Although the heat pump 12 in the first embodiment is replaced with the heat pump 12 in FIG. 25 in the present embodiment, each of the heat pumps 12 in the above-described second to seventh embodiments may be replaced with the heat pump 12 in FIG. 25.

Other Embodiments (1) Although the two cold bodies 22 and 58 are provided in the above-described second embodiment, a configuration without one of the two cold bodies 22 and 58 is conceivable. In short, it is essential only that at least one of the cold bodies 22 and 58 be provided. This holds true for the third and following embodiments.

(2) Although the condenser 28 is provided on the upstream side of the refrigerant flow unit 271 of the liquid heater 27 in the refrigerant flow direction in the above-described third embodiment, the condenser 28 may be provided on a downstream side of the refrigerant flow unit 271 of the liquid heater 27 in the refrigerant flow direction on the contrary.

Although the refrigerant evaporator 36 is provided on the upstream side of the refrigerant flow unit 351 of the liquid cooler 35 in the refrigerant flow direction in the above-described second embodiment, the refrigerant evaporator 36 may be provided on a downstream side of the refrigerant flow unit 351 of the liquid cooler 35 in the refrigerant flow direction on the contrary.

(3) Although the flowchart in FIG. 2 includes step S101 in the above-described first embodiment, a flowchart without step S101 is conceivable. For example, if the cold body 22 generates heat to such an extent as to be able to heat the liquid medium circulating through the liquid medium circuit 14 or 16 to which the cold body 22 is connected whether the cold body 22 is connected to the first-liquid-medium circuit 14 or the second-liquid-medium circuit 16, step S101 is unnecessary. This holds true for the second embodiment.

(4) Although the flowchart in FIG. 2 includes step S102 in the above-described first embodiment, a flowchart without step S102 is conceivable. When the flowchart in FIG. 2 is configured in this manner, if it is determined that the temperature Ts of the cold body 22 is equal to or lower than the temperature TH of the first liquid medium at step S101, the electronic control unit 20 proceeds to step S103.

In other words, if it is determined that the temperature Ts of the cold body 22 is higher than the temperature TH of the first liquid medium, the electronic control unit 20 causes the circuit switching device 19 to connect the cold body 22 to the first-liquid-medium circuit 14. On the other hand, if it is determined that the temperature Ts of the cold body 22 is equal to or lower than the temperature TH of the first liquid medium, the electronic control unit 20 causes the circuit switching device 19 to connect the cold body 22 to the second-liquid-medium circuit 16. In this way, it is possible to prevent the cold body 22 from absorbing heat from the first liquid medium when the cold body 22 is connected to the first-liquid-medium circuit 14. This holds true for the second and third embodiments.

(5) Although the determinations related to the temperature TL of the second liquid medium, the low-pressure-side refrigerant pressure Ps, and the flow rate Vwl of the second liquid medium are performed at step S102 included in the flowchart in FIG. 2 in the above-described first embodiment, this is merely an example. In other words, it is unnecessary to perform the determinations related to all of the physical quantities TL, Ps, and Vwl at step S102. For example, the determination related to only one of the physical quantities TL, Ps and Vwl may be performed. This holds true for the flowcharts in FIGS. 5, 6, 8, 9, 14, and 16.

(6) Although a heat exchange amount between the outside air AR2 and the second liquid medium in the outside-air heat absorber 44 is adjusted by increase and decrease of the flow rate of the second liquid medium flowing into the outside-air heat absorber 44 in the above-described fifth embodiment, this is merely an example. The heat exchange amount between the outside air AR2 and the second liquid medium in the outside-air heat absorber 44 may be adjusted by increasing/decreasing a flow rate of the outside air AR2 supplied to the outside-air heat absorber 44, i.e., a blown air volume of the exterior blower 46, for example.

In this case, in the control processing in FIG. 14, the electronic control unit 20 causes the exterior blower 46 to make the flow rate of the outside air AR2 supplied to the outside-air heat absorber 44 smaller when an outside-air temperature condition that the temperature TL of the second liquid medium is higher than the temperature Ta of the outside air AR2 and that the temperature difference ΔTLa between the temperature TL of the second liquid medium and the temperature Ta is equal to or greater than the threshold value Tix of the temperature difference ΔTLa is satisfied than when the outside-air temperature condition is not satisfied.

Specifically, the first switching valve 66 and the heat absorber bypass passage 62 become unnecessary. At the same time, step S602 in FIG. 14 is replaced with step S602-1 in FIG. 26. At step S602-1, control of the exterior blower 46 is performed in place of the control of the first switching valve 66 so that the exterior blower 46 is caused to blow the outside air AR2. As a result, heat exchange between the second liquid medium and the outside air AR2 is performed in the outside-air heat absorber 44. Step S605 in FIG. 14 is replaced with step S605-1 in FIG. 27. At step S605-1, the control of the exterior blower 46 is performed in place of the control of the first switching valve 66 so that the exterior blower 46 is stopped. As a result, the heat exchange between the second liquid medium and the outside air AR2 is stopped in the outside-air heat absorber 44.

Even if the control of the exterior blower 46 is performed in place of the control of the first switching valve 66 in this manner, it is possible to suppress dissipation of the heat from the second liquid medium to the outside air AR2 (see FIG. 13) in the outside-air heat absorber 44. Step S602-1 in FIG. 26 and step S605-1 in FIG. 27 correspond to the control section.

(7) Although the outside-air heat absorber 44 is the exterior heat exchanger disposed outside the vehicle compartment in each of the above-described embodiments, the outside-air heat absorber 44 may be an interior heat exchanger as a cooler core that is provided in the air conditioning unit disposed in the vehicle compartment and cools the conditioned air AR1 with the second liquid medium.

(8) Although the pressure reducer 32 is a temperature-sensitive mechanical expansion valve in each of the above-described embodiments, the pressure reducer 32 may be an electric expansion valve with a throttle opening for throttling the refrigerant flow adjusted electrically.

(9) Although the processing in each step shown in each of the flowcharts in FIGS. 2, 5, 6, 8, 9, 11, 12, 14 to 16, 26, and 27 is performed by a computer program in the above-described embodiments, this is merely an example. For example, the processing of each step shown in each of the flowcharts may be configured by a hard logic.

(10) According to the above-described first embodiment, the electronic control unit 20 controls the circuit switching device 19 to switch between the connection state in which the cold body 22 is connected to the second-liquid-medium circuit 16 and the disconnection state in which the cold body 22 is disconnected from the second-liquid-medium circuit 16 based on the specified physical quantity relating to heat in the outside-air heat absorber 44. However, this is merely an example. For another example, the electronic control unit 20 may actuate the circuit switching device 19 for the purpose of preventing the frost formation on the outside-air heat absorber 44 or for a purpose other than prevention of the frost formation.

Specifically, it is conceivable that the electronic control unit 20 causes the circuit switching device 19 to switch between the connection state and the disconnection state based on heat-related physical quantities. The heat-related physical quantities are physical quantities related to heat of any of the first-liquid-medium circuit 14, the second-liquid-medium circuit 16, the cold bodies 22 and 58, and the heat pump 12 and include the above-described specified physical quantities. Examples of the heat-related physical quantities include the temperature Ta of the outside air AR2, the temperature TH of the first liquid medium in the first-liquid-medium circuit 14, the flow rate of the first liquid medium, the temperature TL of the second liquid medium in the second-liquid-medium circuit 16, the flow rate Vwl of the second liquid medium, the temperatures Ts, Ts1, and Ts2 of each of the cold bodies, a liquid temperature in the cold body connecting flow path 18, a temperature of the refrigerant in the heat pump 12, and pressure of the refrigerant.

For example, according to the above-described fifth embodiment shown in FIG. 14, the electronic control unit 20 controls the second switching valve 68, which serves as the circuit switching device, to switch between the connection state in which the second cold body 58 is connected to the second-liquid-medium circuit 16 and the disconnection state in which the second cold body 58 is disconnected from the second-liquid-medium circuit 16 based on the heat-related physical quantities, specifically the temperature TL of the second liquid medium and the temperature Ta of the outside air AR2.

It is possible to supply the heat of the cold body 22 to the second liquid medium as required even when the electronic control unit 20 controls the circuit switching device 19 to switch between the connection state in which the cold body 22 is connected to the second-liquid-medium circuit 16 and the disconnection in which the cold body 22 is disconnected from the second-liquid-medium circuit 16 based on the heat-related physical quantities as described above. The heat of the second liquid medium is eventually supplied to the conditioned air AR1 via the heat pump 12. Therefore, by provision and reception of the heat to and from the cold body 22 and the second liquid medium, it is possible to enhance the heating performance.

(11) Although the two cold bodies 22 and 58 are provided as shown in FIG. 10 in the above-described fourth embodiment, a configuration without one of the two cold bodies 22 and 58 is conceivable. For example, if the first cold body 22 is not provided, the first heat-source flow path 141 and the first switching valve 142 are not provided either. On the other hand, if the second cold body 58 is not provided, the second heat-source flow path 161 and the second switching valve 162 are not provided either.

(12) Although the flowchart in FIG. 16 includes steps S101, S102, and S104 in the above-described seventh embodiment, a flowchart without steps S101, S102, and S104 is conceivable.

The present disclosure is not limited to the above-described embodiments. The present disclosure includes various modifications and changes within a scope of the present embodiment. The above-described embodiments are not unrelated to each other and can be combined with each other except for a case where the combination is clearly improper. In the above-described embodiments, it is to be understood that elements constituting the embodiments are not necessary except for a case of being explicitly specified to be necessary and a case of being considered to be absolutely necessary in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

What is claimed is:

1. An air conditioning system that performs a heating operation for heating an air-conditioning target space, the air conditioning system comprising:
   a heat pump that includes
      a liquid cooler,
      a compressor that draws refrigerant flowing out of the liquid cooler, compresses the refrigerant, and discharges the refrigerant,
      a refrigerant radiator into which the refrigerant flows from the compressor, the refrigerant radiator dissipating at least a part of heat of the refrigerant to a conditioned air, the conditioned air being blown into the air-conditioning target space, and
      a pressure reducer that reduces a pressure of the refrigerant flowing out of the refrigerant radiator and flows the refrigerant to the liquid cooler;
   a first-liquid-medium circuit through which a first liquid medium circulates;
   a second-liquid-medium circuit that is provided separately from the first-liquid-medium circuit, the second-liquid-medium circuit through which a second liquid medium circulates;
   a heat source that generates heat;
   a connection switching device that switches between a connection state in which the heat source is connected to the second-liquid-medium circuit and a disconnection state in which the heat source is disconnected from the second-liquid-medium circuit; and
   a controller that controls the connection switching device, wherein
   the refrigerant radiator includes a liquid heater that transfers the heat of the refrigerant to the first liquid medium by performing a heat exchange between the first liquid medium and the refrigerant,
   the liquid cooler transfers heat of the second liquid medium to the refrigerant by performing a heat exchange between the second liquid medium and the refrigerant,
   the controller controls the connection switching device to switch between the connection state and the disconnection state based on a heat-related physical quantity relating to a heat of the first-liquid-medium circuit, a heat-related physical quantity relating to a heat of the second-liquid-medium circuit, a heat-related physical quantity relating to the heat generated by the heat source, or a heat-related physical quantity relating to a heat of the heat pump
   the second liquid medium circuit includes
      an outside-air heat absorber that transfers heat of an outside air to the second liquid medium by performing a heat exchange between the outside air and the second liquid medium and
      a flow restricting device that restricts a flow of the second liquid medium flowing to the outside-air heat absorber, and
   when an outside-air temperature condition is met, the controller controls the flow restricting device to reduce a flow rate of the second liquid medium, which flows into the outside-air heat absorber, as compared to that when the outside-air temperature condition is not met, the outside-air temperature condition being met when a temperature of the second liquid medium is higher than a temperature of the outside air and a temperature difference between the temperature of the second liquid medium and the temperature of the outside air is a threshold value or greater.

2. The air conditioning system according to claim 1, wherein
   the connection switching device is configured to switch between a connection state in which the heat source is connected to the first-liquid-medium circuit and a disconnection state in which the heat source is disconnected from the first-liquid-medium circuit, and
   the connection switching device
      sets the connection state when interrupting a connection between the heat source and the second-liquid-medium circuit and
      sets the disconnection state when connecting the heat source to the second-liquid-medium circuit.

3. The air conditioning system according to claim 2, wherein
the controller refers to a temperature of the heat source, which is the heat-related physical quantity relating to the heat generated by the heat source, and a temperature of the first liquid medium, which is the physical quantity relating to the heat of the first-liquid-medium circuit, to control the connection switching device, and
the controller controls the connection switching device to set the connection state in which the heat source is connected to the first-liquid-medium circuit when the temperature of the heat source is higher than the temperature of the first liquid medium.

4. The air conditioning system according to claim 3, wherein
the controller further refers to a temperature of the second liquid medium which is the physical quantity relating to the heat of the second-liquid-medium circuit to control the connection switching device, and
the controller controls the connection switching device to set the connection state in which the heat source is connected to the second-liquid-medium circuit when the temperature of the heat source is lower than or equal to the temperature of the first liquid medium and higher than the temperature of the second liquid medium.

5. The air conditioning system according to claim 2, wherein
the second liquid medium circuit includes an outside-air heat absorber that transfers heat of an outside air to the second liquid medium by performing a heat exchange between the outside air and the second liquid medium, and
the controller
controls the connection switching device to set the connection state in which the heat source is connected to the first-liquid-medium circuit before a specified time elapses from a time where the heating operation starts and
controls the connection switching device to set the connection state in which the heat source is connected to the second-liquid-medium circuit after the specified time elapses from the time where the heating operation starts.

6. The air conditioning system according to claim 1, wherein
the second liquid medium circuit includes
an outside-air heat absorber that transfers heat of an outside air to the second liquid medium by performing a heat exchange between the outside air and the second liquid medium and
an air-volume changing device that increases and decreases a volume of the outside air supplied to the outside-air heat absorber, and
when an outside-air temperature condition is met, the controller controls the air-volume changing device to reduce the volume of the outside air, which is supplied to the outside-air heat absorber, as compared to that when the outside-air temperature condition is not met, the outside-air temperature condition being met when a temperature of the second liquid medium is higher than a temperature of the outside air and a temperature difference between the temperature of the second liquid medium and the temperature of the outside air is a threshold value or greater.

7. The air conditioning system according to claim 1, wherein
the controller refers to a temperature of the heat source, which is the heat-related physical quantity relating to the heat generated by the heat source, and a temperature of the second liquid medium, which is the heat-related physical quantity, to control the connection switching device, and
the controller controls the connection switching device to set the connection state in which the heat source is connected to the second-liquid-medium circuit when the temperature of the heat source is higher than the temperature of the second liquid medium.

8. The air conditioning system according to claim 1, wherein
the refrigerant radiator includes an interior radiator that is connected to the liquid heater in series or in parallel in the heat pump, and
the interior radiator transfers heat of the refrigerant to the conditioned air by performing a heat exchange between the refrigerant and the conditioned air.

9. The air conditioning system according to claim 1, wherein
the refrigerant radiator includes an exterior radiator that is connected to the liquid heater in series or in parallel in a flow path in which the refrigerant, which is discharged by the compressor, flows from the compressor to the pressure reducer, and
the exterior radiator transfers heat of the refrigerant to an outside air by performing a heat exchange between the refrigerant and the outside air.

10. The air conditioning system according to claim 1, wherein
the heat pump includes a refrigerant evaporator that is connected to the liquid cooler in series or in parallel, and
the refrigerant evaporator transfers heat of the refrigerant to an outside air by performing a heat exchange between the refrigerant and the outside air.

11. An air conditioning system that performs a heating operation for heating an air-conditioning target space, the air conditioning system comprising:
a heat pump that includes
a liquid cooler,
a compressor that draws a refrigerant flowing out of the liquid cooler, compresses the refrigerant, and discharges the refrigerant,
a refrigerant radiator into which the refrigerant flows from the compressor, the refrigerant radiator dissipating at least a part of heat of the refrigerant to a conditioned air, the conditioned air being blown into the air-conditioning target space, and
a pressure reducer that reduces a pressure of the refrigerant flowing out of the refrigerant radiator and flows the refrigerant to the liquid cooler;
a first-liquid-medium circuit through which a first liquid medium circulates;
a second-liquid-medium circuit that is provided separately from the first-liquid-medium circuit, the second liquid-medium-circuit through which a second liquid medium circulates;
a heat source that generates heat;
a connection switching device that connects the heat source to the first-liquid-medium circuit or the second-liquid-medium circuit; and
a controller that controls the connection switching device, wherein
the second liquid medium circuit includes an outside-air heat absorber that transfers heat of an outside air to the second liquid medium by performing a heat exchange between the outside air and the second liquid medium, the refrigerant radiator includes a liquid heater that transfers the heat of the refrigerant to the first liquid medium by performing a heat exchange between the first liquid medium and the refrigerant, the liquid cooler transfers heat of the second liquid medium to the refrigerant by performing a heat exchange between the second liquid medium and the refrigerant, and the controller
controls the connection switching device to set the connection state in which the heat source is connected to the first-liquid-medium circuit before a specified time elapses from a time where the heating operation starts and
controls the connection switching device to set the connection state in which the heat source is connected to the second-liquid-medium circuit after the specified time elapses from the time where the heating operation starts.

12. An air conditioning system that performs a heating operation for heating an air-conditioning target space, the air conditioning system comprising:
a heat pump that includes
a liquid cooler,
a compressor that draws a refrigerant flowing out of the liquid cooler, compresses the refrigerant, and discharges the refrigerant,
a liquid heater into which the refrigerant flows from the compressor, and
a pressure reducer that reduces a pressure of the refrigerant flowing out of the liquid heater and flows the refrigerant to the liquid cooler;
a first-liquid-medium circuit through which a first liquid medium circulates;
a second-liquid-medium circuit that is provided separately from the first-liquid-medium circuit, the second liquid-medium-circuit through which a second liquid medium circulates;
a heat source that generates heat; and
a controller, wherein
the first-liquid-medium circuit includes
a radiator that transfers heat of the first liquid medium to a conditioned air by performing a heat exchange between the first liquid medium and the conditioned air,
a heat-source flow path that is connected to the radiator in parallel and supplies the first liquid medium to the heat source, and
a switching valve that opens and closes the heat-source flow path,
the liquid heater transfers heat of the refrigerant to the first liquid medium by performing a heat exchange between the first liquid medium and the refrigerant,
the liquid cooler transfers heat of the second liquid medium to the refrigerant by performing a heat exchange between the second liquid medium and the refrigerant, and
the controller controls the switching valve to open the heat-source flow path when a temperature of the first liquid medium is lower than a temperature of the heat source.

13. The air conditioning system according to claim 12, further comprising a second heat source that generates heat, wherein
the heat source is a first heat source,
the heat-source flow path is a first heat-source flow path,
the switching valve is a first switching valve,
the second-liquid-medium circuit includes
an outside-air heat absorber that transfers heat of an outside air to the second liquid medium by performing a heat exchange between the outside air and the second liquid medium and
a second heat-source flow path that is connected to the outside-air heat absorber in parallel and supplies the second liquid medium to the second heat source, and
a second switching valve that opens and closes the second heat-source flow path, and
the controller controls the switching valve to open the heat-source flow path when a temperature of the second liquid medium is lower than a temperature of the second heat source.

14. An air conditioning system that performs a heating operation for heating an air-conditioning target space, the air conditioning system comprising:
a heat pump that includes
a liquid cooler,
a compressor that draws a refrigerant flowing out of the liquid cooler, compresses the refrigerant, and discharges the refrigerant,
a liquid heater into which the refrigerant flows from the compressor, and
a pressure reducer that reduces a pressure of the refrigerant flowing out of the liquid heater and flows the refrigerant to the liquid cooler;
a first-liquid-medium circuit through which a first liquid medium circulates;
a second-liquid-medium circuit that is provided separately from the first-liquid-medium circuit, the second liquid-medium-circuit through which a second liquid medium circulates;
a heat source that generates heat; and
a controller, wherein
the first-liquid-medium circuit includes a radiator that transfers heat of the first liquid medium to a conditioned air by performing a heat exchange between the first liquid medium and the conditioned air,
the second-liquid-medium circuit includes
an outside-air heat absorber that transfers heat of an outside air to the second liquid medium by performing a heat exchange between the outside air and the second liquid medium and
a heat-source flow path that is connected to the outside-air heat absorber in parallel and supplies the second liquid medium to the second heat source, and
a switching valve that opens and closes the heat-source flow path,
the liquid heater transfers heat of the first liquid medium to the refrigerant by performing a heat exchange between the first liquid medium and the refrigerant,
the liquid cooler transfers heat of the second liquid medium to the refrigerant by performing a heat exchange between the second liquid medium and the refrigerant, and
the controller controls the switching valve to open the heat-source flow path when a temperature of the second liquid medium is lower than a temperature of the heat source.

* * * * *